United States Patent [19]
Murakami et al.

[11] Patent Number: 6,052,644
[45] Date of Patent: Apr. 18, 2000

[54] APPARATUS AND METHOD FOR LIMITING VEHICLE SPEED OF A WORKING VEHICLE

[75] Inventors: Takanobu Murakami; Nobuki Hasegawa, both of Tokyo; Susumu Sato, Oyama, all of Japan

[73] Assignee: Komatsu Ltd., Tokyo, Japan

[21] Appl. No.: 08/860,258

[22] PCT Filed: Dec. 25, 1995

[86] PCT No.: PCT/JP95/02653

§ 371 Date: Jun. 26, 1997

§ 102(e) Date: Jun. 26, 1997

[87] PCT Pub. No.: WO96/20336

PCT Pub. Date: Apr. 7, 1996

[30] Foreign Application Priority Data

Dec. 27, 1994 [JP] Japan ................................. 6-336932
Jun. 1, 1995 [JP] Japan ................................. 7-156740

[51] Int. Cl.[7] ............................. F02D 29/00; F02D 41/04; B60K 41/28
[52] U.S. Cl. ............................. 701/93; 123/319; 123/342; 123/349; 123/351; 123/361; 180/170; 180/179; 701/97
[58] Field of Search ................................. 701/1, 29, 36, 701/70, 93, 94, 97, 99; 180/170, 171, 178, 179; 123/319, 342, 349, 350, 351, 352, 361

[56] References Cited

U.S. PATENT DOCUMENTS 5,327,865  7/1994  Riehemann ............................. 123/397

FOREIGN PATENT DOCUMENTS

| 48-007193 | 1/1973 | Japan . |
| 52-063586 | 5/1977 | Japan . |
| 54-088527 | 7/1979 | Japan . |
| 58-020944 | 2/1983 | Japan . |
| 60-143136 | 7/1985 | Japan . |
| 63-016848 | 5/1988 | Japan . |
| 01-178028 | 7/1989 | Japan . |
| 03-037341 | 2/1991 | Japan . |
| 03-268110 | 11/1991 | Japan . |
| 04-059546 | 5/1992 | Japan . |
| 05-221251 | 8/1993 | Japan . |
| 05-225496 | 9/1993 | Japan . |

*Primary Examiner*—William A. Cuchlinski, Jr.
*Assistant Examiner*—Edward Pipala
*Attorney, Agent, or Firm*—Sidley & Austin

[57] ABSTRACT

The present invention relates to an apparatus and a method for limiting the vehicle speed of a working vehicle which can provide a smooth traveling condition during vehicle speed limit, and which can set a vehicle speed limit suited to environmental conditions. To this end, a vehicle speed control device (10) judges a vehicle speed limit traveling period when a vehicle speed signal is equal to or greater than a vehicle speed limit value, to calculate a corrected depressing stroke signal by a control gain based on a deviation value between the vehicle speed signal and the vehicle speed limit value so that the deviation value becomes smaller to output to an engine control device (40), and judges an accelerated traveling period, when the vehicle speed signal is smaller than the vehicle speed limit value and the corrected depressing stroke signal is larger than a depressing stroke signal, to output the depressing stroke signal to the engine control device (40).

32 Claims, 18 Drawing Sheets

FIG. 3A

| (ADDRESS) | |
|---|---|
| F | VEHICLE SPEED LIMIT VALUE |
| F+1 | CONTROL GAIN OF STABLE VEHICLE SPEED PERIOD |
| F+2 | CONTROL GAIN OF ACCELERATION-DECELERATION PERIOD |
| --- | TIRE DIAMETER OF DRIVE REAR WHEELS |
| | CONTROL GAIN ON VEHICLE SPEED LIMIT |
| | FORMER ACCELERATOR ANGLE OUTPUT VALUE |
| | VEHICLE SPEED VALUE |
| | JUDGMENT RESULT OF ACCELERATION DECELERATION /CONSTANT SPEED |
| | IN VEHICLE SPEED LIMIT RUNNING |
| | VEHICLE SPEED DEVIATION VALUE |

22

{ WITHIN ALLOWABLE WEIGHT (brace covers VEHICLE SPEED LIMIT VALUE, CONTROL GAIN OF STABLE VEHICLE SPEED PERIOD, CONTROL GAIN OF ACCELERATION-DECELERATION PERIOD)

FIG. 3B

| |
|---|
| VEHICLE SPEED LIMIT VALUE |
| CONTROL GAIN OF STABLE VEHICLE SPEED PERIOD |
| CONTROL GAIN OF ACCELERATION-DECELERATION PERIOD |
| |
| |

{ DURING OVERLOAD WEIGHT (brace covers VEHICLE SPEED LIMIT VALUE, CONTROL GAIN OF STABLE VEHICLE SPEED PERIOD)

{ DURING STEEP GRADE (brace covers CONTROL GAIN OF ACCELERATION-DECELERATION PERIOD)

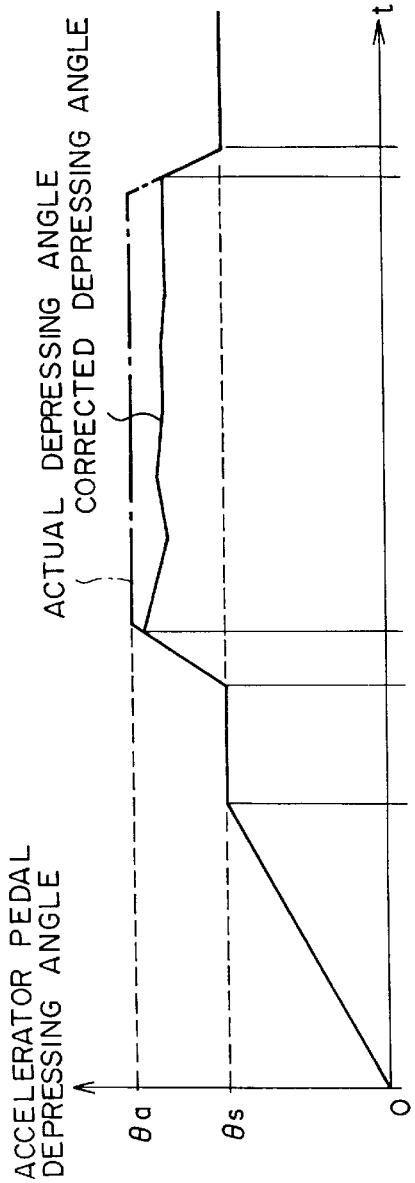
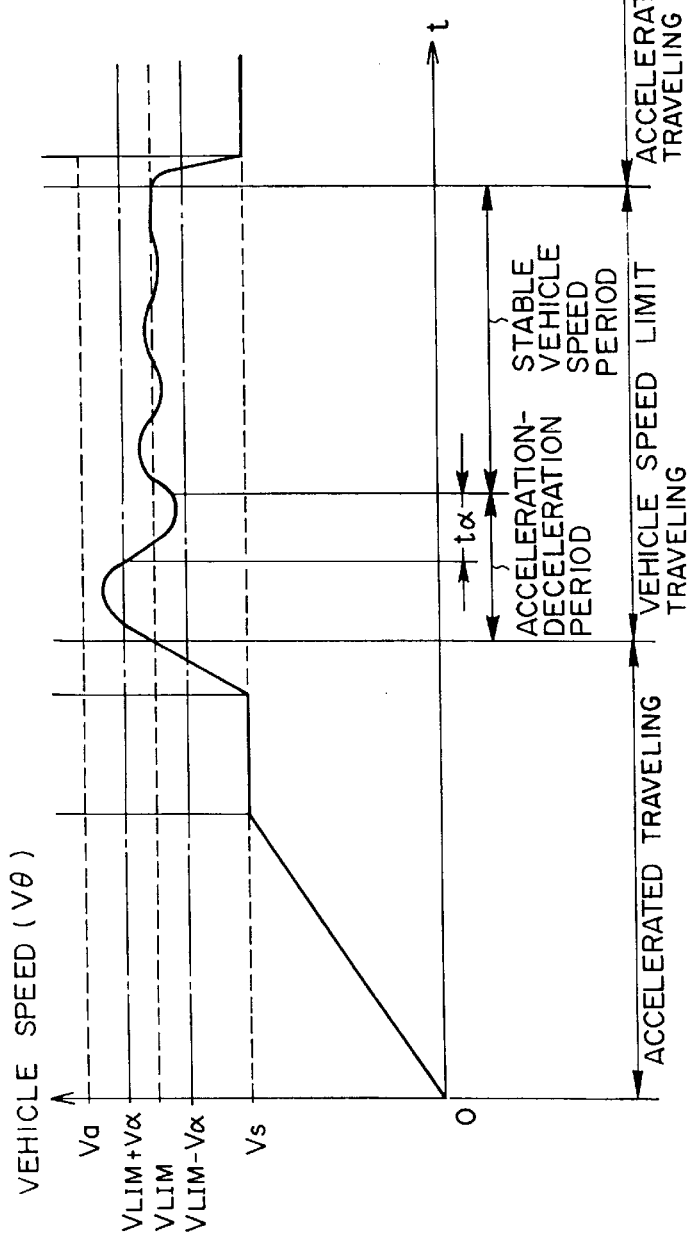
FIG. 5A
FIG. 5B

FIG. 8A
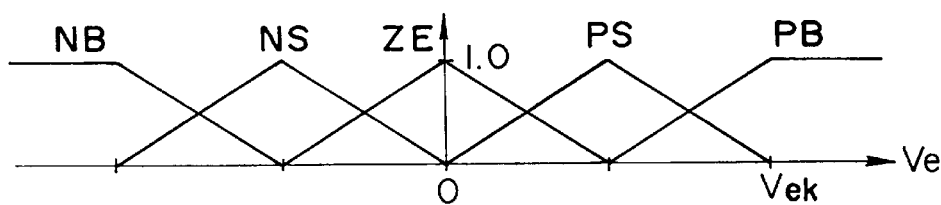
FIG. 8B
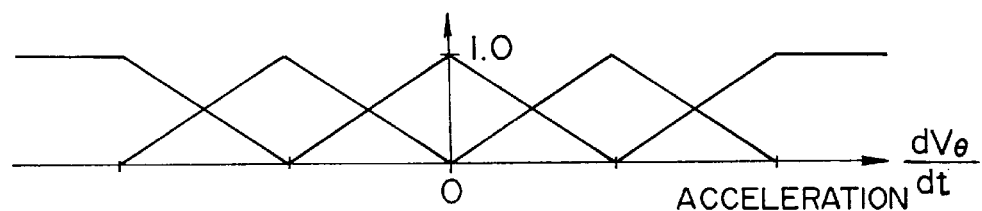
FIG. 8C
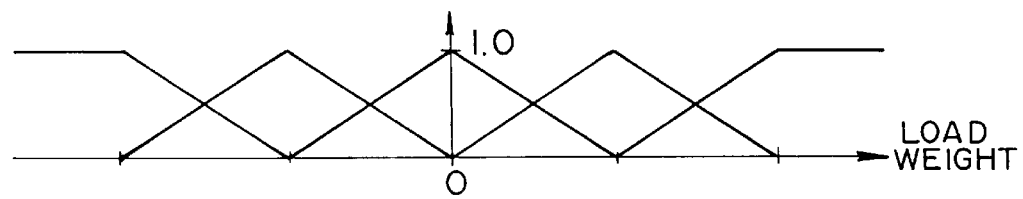
FIG. 9
| i) | IF (DEVIATION = LARGE), (ACCELERATION = LOW), AND (LOAD WEIGHT = HEAVY), THEN (CONTROL GAIN = LARGE). |
|---|---|
| ii) | IF (DEVIATION = SMALL), (ACCELERATION = HIGH), AND (LOAD WEIGHT = LIGHT), THEN (CONTROL GAIN = MEDIUM). |
|  |  |

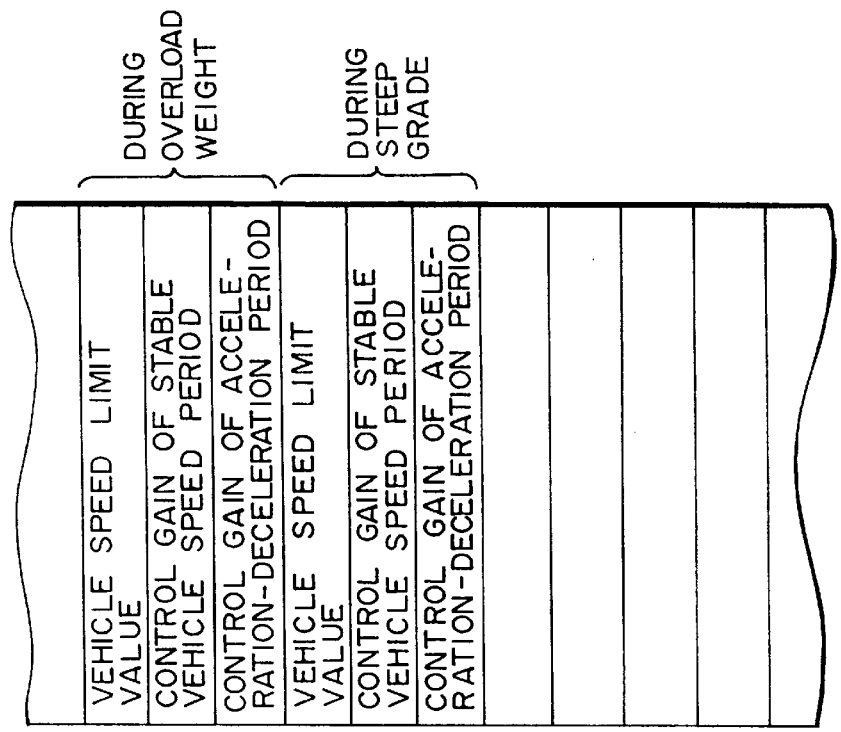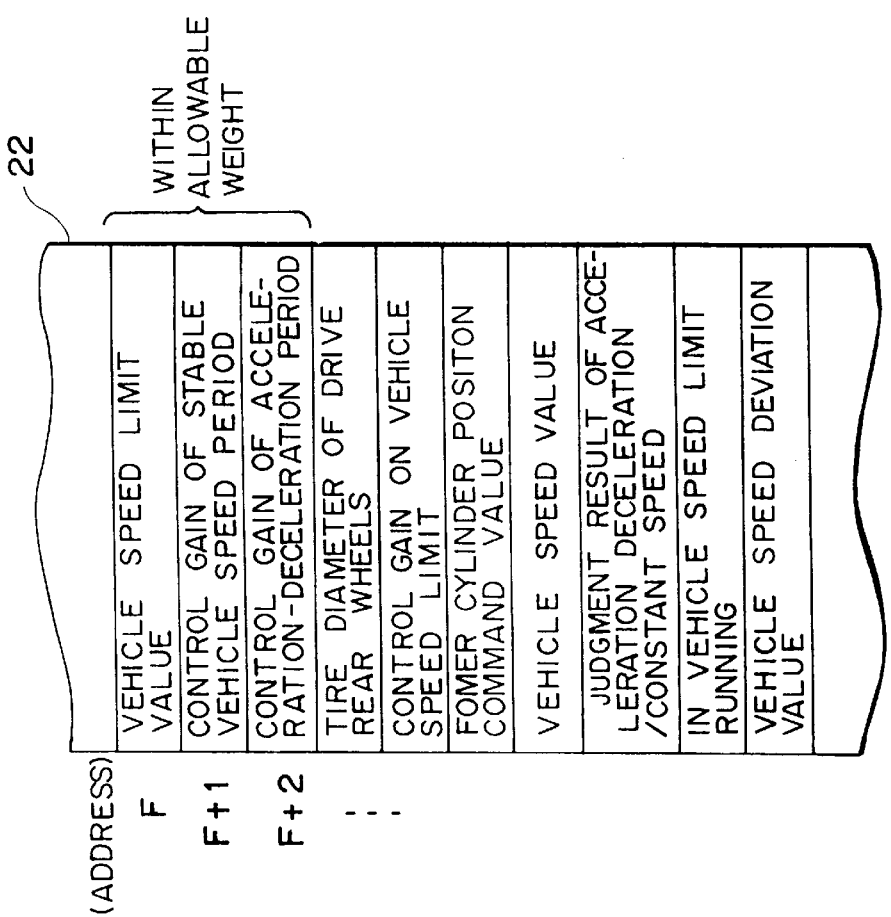
FIG. 14A
FIG. 14B

APPARATUS AND METHOD FOR LIMITING VEHICLE SPEED OF A WORKING VEHICLE

TECHNICAL FIELD

The present invention relates to an apparatus and a method for limiting the vehicle speed of a working vehicle, particularly that of a dump truck.

BACKGROUND ART

Hitherto, in a working vehicle such as a dump truck, the influence of the load on each part of a vehicle, such as the body, the tires, the wheel mounting portions, and the suspension is increased by the weight of earth, sand, stones, and rocks which are loaded on the vehicle at the time of traveling. Particularly, when the load weight is heavier than the set maximum allowable load weight, i.e., when so-called overloaded, the influence of the overload on each part of the vehicle is remarkably increased in a state where a transmission is shifted to a maximum speed stage and the vehicle runs at the maximum engine speed, i.e., a state where the vehicle runs at its allowable maximum speed. For this reason, not only the durability of each part of the vehicle, the tire life, and the ride quality are deteriorated while traveling, but also a road surface is likely to be damaged, so it is necessary to repair the road surface frequently.

In order to solve the above problem, an apparatus for limiting the vehicle speed is proposed so that the vehicle speed does not increase to an allowable maximum speed corresponding to the load weight or higher during traveling under the control of an accelerator pedal (hereinafter, referred to as accelerated traveling). As such an apparatus, a vehicle speed limiting apparatus is proposed in Japanese Unexamined Patent Publication No. 5-221251, for example, in which the shifting of a transmission to a higher speed stage is prohibited in order to limit the maximum traveling speed of a dump truck.

A conventional vehicle speed limiting apparatus will be described with reference to FIGS. 20 to 23. Referring to FIG. 20, the steering front wheels 82 are mounted to the left and right of the front portion of a vehicle body 81 through a suspension cylinder 83, and the driving rear wheels 84 are mounted to the left and right of the back portion of the vehicle body 81 through a suspension cylinder 85. A driver's cab 86 is mounted on the front portion of the vehicle body 81, and a cargo container 87 is vertically pivotably mounted on the back of the vehicle body 81 via a hoist cylinder 88. Each of the suspension cylinders 83 and 85 is provided with a pressure sensor 89 for detecting the pressure in the respective cylinder extension chamber.

Referring to FIG. 21, an output shaft of an engine 45 is connected to an input shaft of a transmission 91, such as a torque flow transmission, and an output shaft of the transmission 91 is connected to the driving rear wheels 84. A speed change control valve 94, for changing each speed change stage, is attached to the transmission 91, and each speed change stage of the transmission 91 is switched by actuating the speed change control valve 94 with a shift signal from a speed change controller 93. A load weight calculator 99 receives pressure signals from the pressure sensors 89 of the suspension cylinders 83 and 85, calculates the load weight from the pressure signals, and outputs a calculated load weight signal to the speed change controller 93. A speed stage signal, from a shift lever 95 located in the driver's cab 86, is inputted to the speed change controller 93.

FIG. 22 shows a case where the speed of the engine 45, having a mechanical governor device, is mechanically controlled by an accelerator pedal 1. That is, when the accelerator pedal 1 is depressed to a position at an angle θop, a member 143 rotates about a first central axis 142 by an angle proportional to the angle θop, whereby the member 143 rotates an accelerator lever 144 of the engine 45 to form an angle corresponding to the angle θop. The accelerator lever 144 actuates a fuel injection pump (not shown) through a mechanical governor device (not shown) integrated into the engine 45, and controls the fuel injection amount and the fuel injection timing so as to obtain an engine speed corresponding to the rotation angle of the accelerator lever 144.

Assume that a characteristic diagram of a fuel injection amount control by the above mechanical governor device is as shown in FIG. 23, for example. The fuel injection amount abruptly decreases at the time when the engine speed increases so as to exceed a maximum allowable speed Nmax, so that the maximum speed of the engine is controlled at any position of the accelerator lever 144.

An operation of the above vehicle speed limiting device (maximum speed limiting device) will now be described.

In the extension chamber of the suspension cylinders 83 and 85, a pressure, which is consistent with the weight of the vehicle body 81 and the cargo container 87, is generated during an empty load; and a pressure, which is higher than the pressure during the empty load by the pressure consistent with the load weight of the cargo container, is generated when earth, sand, etc., are loaded. The load weight calculator 99 obtains a load weight based on the difference between a pressure signal from the pressure sensors 89 when loading earth, sand, etc., and a pressure signal during an empty load, and outputs a load weight signal to the speed change controller 93.

A speed stage suited to the load weight is stored in the speed change controller 93, and a suitable speed stage is selected by a load weight signal from the load weight calculator 99. For example, when the calculated load weight is lighter than the maximum allowable load weight, the speed stage is not limited, and the speed stage can be shifted to the maximum speed stage of the vehicle. Therefore, when the shift lever 95 is switched to the sixth forward speed in a vehicle having six stages of forward speed, the speed change controller 93 outputs to the speed change control valve 94 a shift signal for the sixth forward speed stage, whereby the transmission 91 is switched to the sixth forward speed stage. The traveling speed of the vehicle at this time is controlled to a maximum speed (for example, 45.5 km/h), which is equivalent to the maximum allowable engine speed at the sixth forward speed stage.

However, when the calculated load weight is heavier than the maximum allowable load weight, the upper limit speed stage is limited by the overload weight, and a shifting from the upper limit speed stage to a further upper stage is prohibited. For example, at the time of an overload such that the load weight is 130% of the maximum allowable load weight, the upper limit speed stage is limited to the fifth speed stage during forward motion. Therefore, even if the shift lever 95 is switched to the sixth forward speed stage in the same manner as described above, the speed change controller 93 outputs to the speed change control valve 94 a shift signal for the fifth forward speed stage, whereby the transmission 91 is switched to the fifth forward speed stage.

At this time, even if the accelerator pedal 1 is depressed so as to increase the speed to the maximum speed or higher, the engine speed is limited by the mechanical governor device to the maximum allowable speed or lower. As a result, the traveling speed is limited to the maximum speed at the speed stage thereof. In this way, the traveling speed is controlled to the maximum speed (for example, 33.5 km/h), which is equivalent to the maximum allowable engine speed in the fifth forward speed stage, or lower.

However, according to the vehicle speed limit by the above mechanical governor device, when the engine speed increases to the maximum allowable speed Nmax or higher, the fuel injection amount to the engine 45 abruptly decreases, so that the engine output torque also abruptly decreases. For this reason, when traveling on an uphill grade of large traveling resistance, or on a road surface having many irregularities, the engine rotational speed decreases considerably. However, with the decrease in the rotational speed, the fuel injection amount again increases to increase the engine output torque, so that the vehicle is accelerated again. In this way, when the engine speed is the maximum allowable speed Nmax, the vehicle speed tends to decrease or increase abruptly. This phenomenon might further increase the influence of the load on each part of the vehicle to deteriorate the durability of the vehicle and the ride quality during driving.

In addition, a working vehicle, such as a dump truck, is driven in a work field in cooperation with an excavator, etc., and a plurality of dump trucks and excavators are usually systematically operated within a wide field of a construction area. In such a case, the vehicle speed limit value of each dump truck is preferably set to a value suited to the weather conditions, the field environment, and the system operation conditions. For example, it is necessary to reduce the vehicle speed limit value on a slippery road surface on a bad weather day, and to set the vehicle speed limit value suited to the overload weight in response to road irregularities condition. In addition, it is necessary to set the vehicle speed limit value to a safe operational speed on an operation course where a plurality of dump tracks frequently come and go.

However, the vehicle speed limit value is fixed to the speed determined by the maximum allowable speed Nmax and the speed change gear ratio at each speed stage. That is, the vehicle speed limit value cannot be set to the value suited to the weather conditions, the field environment, and the system operation conditions. For this reason, a driver of the dump truck must drive such that the vehicle speed does not exceed the allowable speed while sufficiently considering the various environmental conditions and operation conditions, thus increasing fatigue during the driving operation.

Another known vehicle speed limiting apparatus is an apparatus for limiting the engine speed to the maximum allowable speed or lower even if the accelerator pedal is depressed to offer the maximum speed or higher, i.e., a so-called vehicle speed limiting apparatus by a rotary limiter. This vehicle speed limiting apparatus, as in the case of the vehicle speed limit by the above mechanical governor device, limits the upper limit speed stage corresponding to an overload weight during overloading, so that the maximum speed at each speed stage is limited to the maximum speed determined by the maximum allowable speed Nmax and the speed change gear ratio for the respective speed stage.

However, according to the vehicle speed limit by the rotary limiter, the fuel supply to the engine is forcibly stopped when the engine rotational speed increases to the maximum allowable speed Nmax, and the fuel supply is started again when the engine rotational speed decreases by a predetermined value with respect to the maximum allowable speed Nmax. For this reason, as in the case of the above mechanical governor, when traveling on an uphill grade, etc., the engine rotational speed decreases considerably, and there is a tendency to cause an abrupt increase or decrease in the vehicle speed. It is thought that such a tendency to torque starvation becomes serious, particularly when the engine maximum allowable speed Nmax is set near a maximum torque point. This phenomenon might further increase the influence of the load on each part of the vehicle to deteriorate the durability of the vehicle and the ride quality during driving.

SUMMARY OF THE INVENTION

The present invention has been made to solve the problems of the prior art, and its object is to provide an apparatus and a method for limiting the vehicle speed of a working vehicle which can provide a smooth traveling condition without deteriorating the ride quality during a vehicle speed limit in accelerated traveling, and which can set a vehicle speed limit value to the vehicle speed value suited to the load weight and the environmental conditions.

In a first aspect of an apparatus for limiting the vehicle speed of a working vehicle according to the present invention, there is provided an apparatus for limiting the vehicle speed of a working vehicle including an accelerator pedal; a depressing stroke detector, for detecting a depressing stroke amount of the accelerator pedal; an engine control device, for outputting an accelerating signal based on the magnitude of a depressing stroke signal inputted from the depressing stroke detector; and an engine, of which the speed is controlled by the accelerating signal; the apparatus comprising:

a vehicle speed detector, for detecting the vehicle speed of the working vehicle to output a vehicle speed signal; and a vehicle speed control device, which is connected to the depressing stroke detector, the vehicle speed detector, and the engine control device;

wherein the vehicle speed control device:

inputs the vehicle speed signal and the depressing stroke signal to compare the vehicle speed signal with a predetermined vehicle speed value, judges a vehicle speed limit traveling period, when the vehicle speed signal is the vehicle speed limit value or higher, to calculate a corrected depressing stroke signal by a control gain, which obtains a correction amount of the depressing stroke signal based on a deviation value between the vehicle speed signal and the vehicle speed limit value so that the deviation value becomes smaller, to output the corrected depressing stroke signal to the engine control device, and judges an accelerated traveling period, when the vehicle speed signal is smaller than the vehicle speed limit value and the corrected depressing stroke signal is larger than said depressing stroke signal, to output the depressing stroke signal to the engine control device.

According to such a construction, the vehicle speed limit value is set to a value which is different from the maximum speed value, determined by the maximum allowable speed Nmax and a speed change gear ratio at the maximum speed stage. When the vehicle speed becomes higher than the vehicle speed limit value, the corrected depressing stroke signal is calculated so that the deviation value becomes smaller to output to the engine control device. This performs vehicle speed limit control, so that a smooth traveling can be obtained without deteriorating the ride quality during a vehicle speed limit in accelerated traveling.

In a second aspect of an apparatus for limiting a vehicle speed of a working vehicle, there is provided an apparatus, comprising:

a vehicle speed detector, for detecting the vehicle speed of the working vehicle to output a vehicle speed signal; and a vehicle speed control device, which is connected to the depressing stroke detector, the vehicle speed detector, and the engine control device;

wherein the vehicle speed control device:

inputs the vehicle speed signal and the depressing stroke signal to compare a predetermined vehicle speed threshold value, which is smaller than a vehicle speed limit value, with the vehicle speed signal, judges a vehicle speed limit traveling period, when the vehicle speed signal is the vehicle speed threshold value or higher, to calculate a corrected depressing stroke signal by a control gain, which obtains a correction amount of the depressing stroke signal based on an acceleration calculated from the vehicle speed signal and a deviation value between the vehicle speed signal and the vehicle speed limit value so that said deviation value becomes smaller, and to output the corrected depressing stroke signal to the engine control device, and judges an accelerated traveling period, when the vehicle speed signal is smaller than the vehicle speed threshold value, to output the depressing stroke signal to the engine control device.

According to such a construction, when the vehicle speed exceeds the vehicle speed threshold value, the corrected depressing stroke signal is calculated based on the deviation value, the acceleration, and a predetermined control gain so that the deviation value becomes smaller. The corrected depressing stroke signal is outputted to the engine control device to perform the vehicle speed limit, so that the overshoot amount is small and the vehicle speed promptly converges on the vehicle speed limit value.

Inventions according to the first or second aspect of the above-described vehicle speed limiting apparatus will be described below.

The vehicle speed control device can comprise:

an acceleration-deceleration/constant speed judging means, for judging a stable vehicle speed period, when the deviation value in the vehicle speed limit traveling period is less than or equal to a predetermined value over a predetermined period of time, and for judging an acceleration-deceleration period, in a case other than the stable vehicle speed period, to output the results of the judgment;

a control gain changing means, for outputting the control gain in response to the results of the judgment; and a vehicle speed limit control means, for judging either the vehicle speed limit traveling period or the accelerated traveling period, to output the calculated corrected depressing stroke signal or the depressing stroke signal to the engine control device in response to either of the judged periods.

The corrected depressing stroke signal can be the corrected depressing stroke signal, such that the depressing stroke signal is corrected based on the deviation value and the control gain.

The apparatus can further comprise a warning device for inputting a warning signal from the vehicle speed control device to give a warning to a driver, and the vehicle speed control device can output an accelerating stop signal, such that the corrected depressing stroke signal is zero, and can output the warning signal when the deviation value is not within a predetermined range of values even if the accelerating stop signal is continuously outputted for a predetermined period of time.

A control constant setting means, having a set value input means for setting the vehicle speed limit value and the control gain in advance, or having the set value input means and a set value display means for displaying the set value, can be attached; and the control constant setting means and the vehicle speed control device can mutually input and output set value information such as the set value.

An environmental condition detecting means, for detecting a traveling situation of the working vehicle and an external environmental situation to output the detected situation signal to the vehicle speed control device, can be attached; and the vehicle speed control device can select the vehicle speed limit value and the control gain corresponding to the situation signal to calculate the corrected depressing stroke signal.

A radio receiver, or a radio receiver and a radio transmitter can be attached to the control constant setting means, and the set value information received from an outside station by radio can be outputted to the vehicle speed control device and/or the set value information and the situation signal inputted to the vehicle speed control device can be transmitted to the outside station by radio.

The apparatus can further comprise:

a transmission having a plurality of speed stages;

a speed change control device, for inputting downshift judging vehicle speed value data and upshift judging vehicle speed value data in advance, for comparing the judging vehicle speed data with the present vehicle speed data to judge the possibility of a speed change of the speed stages, and for outputting to the corresponding speed stage a shifting signal to control the transmission when the speed change is possible; and a brake control device, for outputting a brake control signal based on a braking signal to control a brake, and the vehicle speed control device can output an accelerating stop signal such that the corrected depressing stroke signal is zero, and can output either the downshift or upshift judging vehicle speed value data, or the braking signal when the deviation value is not within the predetermined range of values even if the accelerating stop signal is continuously outputted for a predetermined period of time.

Action and effects of the invention attendant to the first and second aspects of the vehicle speed limiting apparatus will be described.

When the working vehicle is traveling within a predetermined vehicle speed range near the vehicle speed limit value over a predetermined period of time, the stable vehicle speed period is judged. In this period, the control gain is set suitably small so as to stabilize the vehicle speed. On the other hand, in the vehicle speed limit period other than the stable vehicle speed period, i.e., in the acceleration-deceleration period, the deviation of the vehicle speed can be sensitively decreased in a short period of time. That is, the control gain is suitably set large, and the acceleration-deceleration characteristic is taken seriously to improve the response. By switching the optimum control gain in the stable vehicle speed period and in the acceleration-deceleration period, the control characteristic of the vehicle speed is improved.

In the case of calculating the corrected depressing stroke signal by correcting the depressing stroke signal based on the deviation value and the control gain, the vehicle speed can be controlled to the vehicle speed limit value in a shorter period of time when the correction amount is calculated in response to the magnitude of the depressing stroke signal from the depressing stroke detector. That is, when the vehicle speed, equivalent to the magnitude of the depressing stroke signal, is far from the vehicle speed limit value, the corrected depressing stroke signal can reach the equivalent of the vehicle speed limit value in a short period of time by increasing the correction amount. This improves the response at the time of accelerating and decelerating regardless of the depressing amount of the accelerator pedal.

In addition, for example, in the case of traveling on a steep downhill for a long period of time, the deviation between the vehicle speed signal and the vehicle speed limit value may not become smaller within a predetermined value even if the corrected depressing stroke signal outputs an accelerating stop signal of zero to the engine control device, and the outputting of the accelerating stop signal is maintained for a predetermined period of time. In this way, when an uncontrollable state of the vehicle speed limit continues for a predetermined period of time, it is desirable to inform a driver of the uncontrollable state of the vehicle speed limit, and to warn the driver of the need for paying attention to the vehicle speed during driving.

By attaching the control constant setting means, and by providing a set value input means thereof, such as a key switch, a control constant, such as the vehicle speed limit value, and the control gain value can be arbitrarily set to a predetermined value suited to the load weight and the environmental conditions. In addition, the set information can be checked by displaying it on a display means.

By attaching the environmental condition detecting means, a vehicle speed limit control, fitted to various vehicle traveling situations and external environmental conditions, becomes possible. That is, when setting the vehicle speed limit value and the control gain, a set value suited to various environmental conditions, such as load weight, slip situation of tires, conditions of inner pressure and temperature of tires, magnitude of the grade of the road surface, roughness condition of irregularities of the road surface, etc., can be set for each condition. The vehicle speed control device selects the set value most suitable for the vehicle traveling situations, etc., from the various set values of the control constants. This can further improve the durability of the vehicle, the traveling stability, the ride quality, and the vehicle speed stability.

By providing the radio transmitter receiver to the control constant setting means, control constant data, such as the vehicle speed limit value received from the outside station by radio, and the control gain are outputted to the vehicle speed control device as the set value information. This allows the outside station to set control constant in one operation and at the same time to a plurality of working vehicles. More specifically, when the working vehicles are systematically operated in a wide field of construction area, it is usually more convenient in terms of system control and operation control that the vehicle speed limit value and the control gain can be set in one operation from the outside for the required time so as to be suited to the daily weather condition, the field environment condition, and the system operation condition. Particularly, when the control constant must be suited to the performance and the characteristics of a plurality of working vehicles, and, at the same time, must be set to the value suited to the system operation conditions of the working vehicles, an improvement in the workability of the system control and a batch operation control can be achieved. By providing the radio transmitter and receiver, the set value information, the vehicle condition signal information, and the external environmental condition signal are transmitted to the outside station by radio, so that the systematic operation can easily be controlled.

By attaching the transmission, the speed change control device, and the brake control device, a combined control of the speed change stage shift control and the brake control can be achieved. The combined control excellently deals with a case where the deviation value does not become smaller even if the accelerating stop signal is outputted for a predetermined period of time, for example, a case where vehicle speed limit is only by the engine control of the engine control device in the coasting state. That is, by causing hard downshifting or upshifting of the transmission in order to increase the braking torque, and by actuating the brake, the braking force of the vehicle speed limit increases, thus achieving stable and positive vehicle speed limit.

In a third aspect of an apparatus for limiting the vehicle speed of a working vehicle, there is provided an apparatus for limiting the vehicle speed of a working vehicle including an accelerator pedal; an accelerator lever, operated based on a depressing stroke amount of the accelerator pedal; and an engine, of which the rotational speed is controlled by the accelerator lever through a mechanical governor device; the apparatus comprising:

a vehicle speed detector, for detecting the vehicle speed of the working vehicle;

a vehicle speed control device, for inputting a vehicle speed signal from the vehicle speed detector;

a driving device, for inputting a command from the vehicle speed control device; and an actuator, driven by the driving device, for correcting the depressing stroke amount to control the accelerator lever;

wherein the vehicle speed control device judges a vehicle speed limit traveling period, when the vehicle speed signal is a predetermined vehicle speed limit value or higher, to output a command calculated by a control gain based on a deviation value between the vehicle speed signal and the vehicle speed limit value, or based on the acceleration calculated from the vehicle speed signal and the deviation value such that the deviation value becomes smaller, and judges an accelerated traveling period when the vehicle speed signal is smaller than the vehicle speed limit value, and the calculated command is smaller than a predetermined initial value to output a command of the initial value.

According to such a construction, as in the case of the first aspect of the vehicle speed limiting apparatus, when the vehicle speed becomes higher than the vehicle speed limit value, the vehicle speed limit traveling period is judged so as to decrease the deviation value between the vehicle speed and the vehicle speed limit value. That is, a command to the actuator is calculated and outputted based on the deviation value and the control gain. The actuator is controlled by the command to perform control of the vehicle speed limit, so that a smooth traveling condition can be obtained without deteriorating the ride quality during the vehicle speed limit.

In a fourth aspect of an apparatus for limiting a vehicle speed of a working vehicle, there is provided an apparatus, comprising:

a vehicle speed detector for detecting vehicle speed of the working vehicle;

a vehicle speed control device in which a vehicle speed limit value and a predetermined vehicle speed threshold value smaller than the vehicle speed limit value are set in advance, and to which the vehicle speed signal is inputted from the vehicle speed detector;

a driving device for inputting a command from the vehicle speed control device; and an actuator driven by the driving device, and correcting the depressing stroke amount to control the accelerator lever, wherein the vehicle speed control device judges a vehicle speed limit traveling period, when the vehicle speed signal is the vehicle speed threshold value or higher, to output a command calculated by a control gain based on a deviation value between the vehicle speed signal and the vehicle speed limit value, or based on acceleration calculated from the vehicle speed signal and the deviation value such that the deviation value becomes smaller, and judges an accelerated traveling period, when the vehicle speed signal is smaller than the vehicle speed threshold value, to output a command of a predetermined initial value.

According to such a construction, as in the case of the second aspect of the vehicle speed limiting apparatus, when the vehicle speed exceeds the vehicle speed threshold value, the deviation is decreased. That is, a command to the actuator is calculated and outputted based on the deviation value, the acceleration, and the control gain. Since the vehicle speed limit control is performed by the command signal, the overshoot amount is small, and the vehicle speed promptly converges on the vehicle speed limit value.

Inventions according to the third aspect or the fourth aspect of the above-described vehicle speed limiting apparatus will be shown below.

The actuator can be an air cylinder or a motor. In addition, the driving device can be a solenoid air valve for controlling the air pressure of at least one of the bottom side and the head side of the air cylinder.

The apparatus can further comprise:

a first shaft having the accelerator pedal adhered to the outer periphery thereof;

a first member of which one end is adhered to the first shaft, and which rotates about a first central axis of the first shaft in proportion to the depressing stroke amount; and a second shaft through which the other end of the first member is passed in a direction of a second central axis which is parallel to the first central axis, and which freely rotates about the second central axis while being supported by the first member, and the actuator can rotate the second shaft about the second central axis, and the second shaft can be rotated by the actuator or the accelerator pedal to actuate the accelerator lever.

The apparatus can further comprise: a depressing stroke detector, for detecting the depressing stroke amount; and an accelerator lever operating position detector, for detecting an operating position of the accelerator lever; and the vehicle speed control device can input the depressing stroke amount and the operating position, can convert the operating position into the depressing stroke amount based on a mechanical location, and can compare the converted depressing stroke amount with the inputted depressing stroke amount to conduct fault diagnosis.

The vehicle speed control device can comprise:

an acceleration-deceleration/constant speed judging means for judging a stable vehicle speed period, when the deviation value in the vehicle speed limit traveling period is less than or equal to a predetermined value over a predetermined period of time, and for judging an acceleration-deceleration period in a case other than the stable vehicle speed period, to output the results of the judgment;

a control gain changing means, for outputting the control gain in response to the results of the judgment; and a vehicle speed limit control means, for judging either the vehicle speed limit traveling period or the accelerated traveling period, for calculating and outputting a position command signal of the actuator based on the control gain when judging the vehicle speed limit traveling period, and for outputting a command signal which is the initial value of the actuator when judging the accelerated traveling period.

The apparatus can further comprise a depressing stroke detector for detecting the depressing stroke amount, and the vehicle speed control device can calculate a correction value of the position command signal, based on the control gain in response to the depressing stroke amount, to output the position command signal correction value.

The apparatus can further comprise a warning device for inputting a warning signal from the vehicle speed control device to give warning to a driver, and the vehicle speed control device can output the warning signal when the accelerator lever is placed in a total close position by the position command signal correction value, and when the deviation value is not within a predetermined range of values even if the state of the total close position is continued for a predetermined period of time.

The apparatus can further comprise a control constant setting means having a set value input means for setting the vehicle speed limit value and the control gain in advance, or having the set value input means and a set value display means for displaying the set value, and the control constant setting means and the vehicle speed control device can mutually input and output set value information such as the set value.

An environmental condition detecting means, for detecting a traveling situation of the working vehicle and an external environmental situation to output the detected situation signal to the vehicle speed control device, can be attached, and the vehicle speed control device can select the vehicle speed limit value and the control gain corresponding to the situation signal to calculate a correction value of the position command signal of the actuator.

A radio receiver, or the radio receiver and a radio transmitter can be attached to the control constant setting means, and the set value information received from an outside station by radio can be outputted to the vehicle speed control device and/or the set value information and the situation signal inputted to the vehicle speed control device can be transmitted to the outside station by radio.

The apparatus can further comprise:

a transmission having a plurality of speed stages;

a speed change control device for inputting downshift judging vehicle speed value data and upshift judging vehicle speed value data in advance, for comparing the judging vehicle speed data with the present vehicle speed data to judge the possibility of a speed change of the speed stages, and for outputting a shifting signal to the corresponding speed stage to control the transmission when the speed change is possible; and a brake control device for outputting a brake control signal based on a braking signal to control a brake, and the vehicle speed control device can desirably calculate a correction value of the position command signal based on the control gain, and output either the downshift or upshift judging vehicle speed value data, or the braking signal when the accelerator lever is placed in a total close position by the position command signal correction value, and the deviation value is not within a predetermined value even if the state of the total close position is continued for a predetermined period of time.

Action and effects of the invention attendant to the third and fourth aspects of the vehicle speed limiting apparatus will be described.

By employing the air cylinder as the actuator, and by controlling the air pressure of the bottom side and the head side of the air cylinder with the solenoid air valve, a control with good response becomes possible. In addition, the structure such that the depressing stroke amount is corrected by the actuation of the actuator can be downsized and simplified, so that the conventional structure can easily be modified.

In the case of operating the accelerator lever through the first member and the second shaft, etc., the accelerator lever operates in response to the depressing stroke amount corrected by the accelerator pedal and the actuator.

By providing the depressing stroke detector and the accelerator lever operating position detector, the accelerator lever operating position can be converted into the accelerator pedal depressing stroke amount (depressing angle) by a mechanical location from the accelerator pedal to the accelerator lever. By comparing the converted depressing angle with the actual accelerator pedal depressing stroke amount (depressing angle) to conduct fault diagnosis, a vehicle speed limiting apparatus with a high degree of reliability can be obtained.

When the vehicle speed limiting apparatus comprises the acceleration-deceleration/constant speed judging means, the control gain changing means, and the vehicle speed limit control means, the action and effects are the same as those of the invention appendant to the above-described first and second aspects. The deviation value of the vehicle speed can be decreased in a short period of time, the response is improved, and the control characteristic is improved.

When the position command signal correction value of the actuator is calculated in response to the depressing stroke amount from the depressing stroke detector, the calculation is effected so that the correction amount of the position command increases in response to the depressing stroke amount, so that the response at the time of accelerating and decelerating is improved regardless of the depressing amount of the accelerator pedal.

When the deviation value is not within the predetermined range of values even if the state of the total close position of the accelerator lever continues for a predetermined period of time, the warning device for outputting a warning signal is provided so as to inform the driver of the uncontrollable state of the vehicle speed limit, similar to the above description.

In addition, the action and effects in the case of including the control constant setting means, in the case of attaching the environmental condition detecting means, in the case of attaching the radio receiver and the radio transmitter to the control constant setting means, and in the case of including the vehicle speed control device and the brake control device are the same as those of the invention appendant to the third and fourth aspects described above.

Next, in a first aspect of a method of limiting the vehicle speed of a working vehicle according to the present invention, there is provided a method of limiting the vehicle speed of a working vehicle to a vehicle speed limit value or lower based on a depressing stroke amount of an accelerator pedal and the vehicle speed, the method comprising:

judging a vehicle speed limit traveling period, when the vehicle speed is the vehicle speed limit value or higher, to calculate a corrected depressing stroke amount based on a deviation value between the vehicle speed and the vehicle speed limit value so that the deviation value becomes smaller, and to control the vehicle speed by the corrected depressing stroke amount; and judging an accelerated traveling period, when the vehicle speed is lower than the vehicle speed limit value, and the corrected depressing stroke amount is larger than the depressing stroke amount, to control the vehicle speed by the depressing stroke amount.

Such a combination is the method invention corresponding to the first aspect of the above-described vehicle speed limiting apparatus, whereby similar action and effects can be obtained.

In a second aspect of a method for limiting the vehicle speed of a working vehicle, there is provided a method comprising:

setting in advance a predetermined vehicle speed threshold value which is smaller than the vehicle speed limit value;

judging a vehicle speed limit traveling period, when the vehicle speed is the vehicle speed threshold value or higher, to calculate a corrected depressing stroke amount, based on the acceleration calculated from the vehicle speed and a deviation value between the vehicle speed and the vehicle speed limit value so that the deviation becomes smaller, and to control the vehicle speed by the corrected depressing stroke amount; and judging an accelerated traveling period, when the vehicle speed is lower than the vehicle speed threshold value, to control the vehicle speed by the depressing stroke amount.

Such a combination is the method invention corresponding to the second aspect of the above-described vehicle speed limiting apparatus, whereby similar action and effects can be obtained.

BRIEF DESCRIPTION OF DRAWINGS

FIGS. 3A and 3B show addresses and data stored in a RAM according to the first embodiment, in which FIG. 3A is an illustrated of data relating to "within allowable weight", and FIG. 3B is an illustration of data relating to "at the time of overloading";

FIG. 5A is a graph showing changes with time in a depressing angle from a vehicle stop condition according to the first embodiment;

FIG. 5B is a graph showing changes with time in vehicle speed corresponding to FIG. 5A;

FIG. 8A, FIG. 8B, and FIG. 8C are diagrams showing membership functions of a fuzzy inference control according to the second embodiment, in which FIG. 8A is a diagram in which a condition of judgment is vehicle speed deviation;

FIG. 8B is a diagram in which a condition of judgment is acceleration; and

FIG. 8C is a diagram in which a condition of judgment is load weight;

FIG. 9 is a diagram of rules illustrating control by fuzzy inference according to the second embodiment;

FIG. 14A and FIG. 14B show addresses and data stored in a RAM according to the third embodiment, in which FIG. 14A is an illustration of data relating to "within allowable weight", and FIG. 14B is an illustration of data relating to "at the time of overloading" and "at the time of steep grade";

BEST MODE FOR CARRYING OUT THE INVENTION

The preferred embodiments of an apparatus and a method for limiting the vehicle speed of a working vehicle according to the present invention will be described in detail with reference to the attached drawings.

Figure 1:
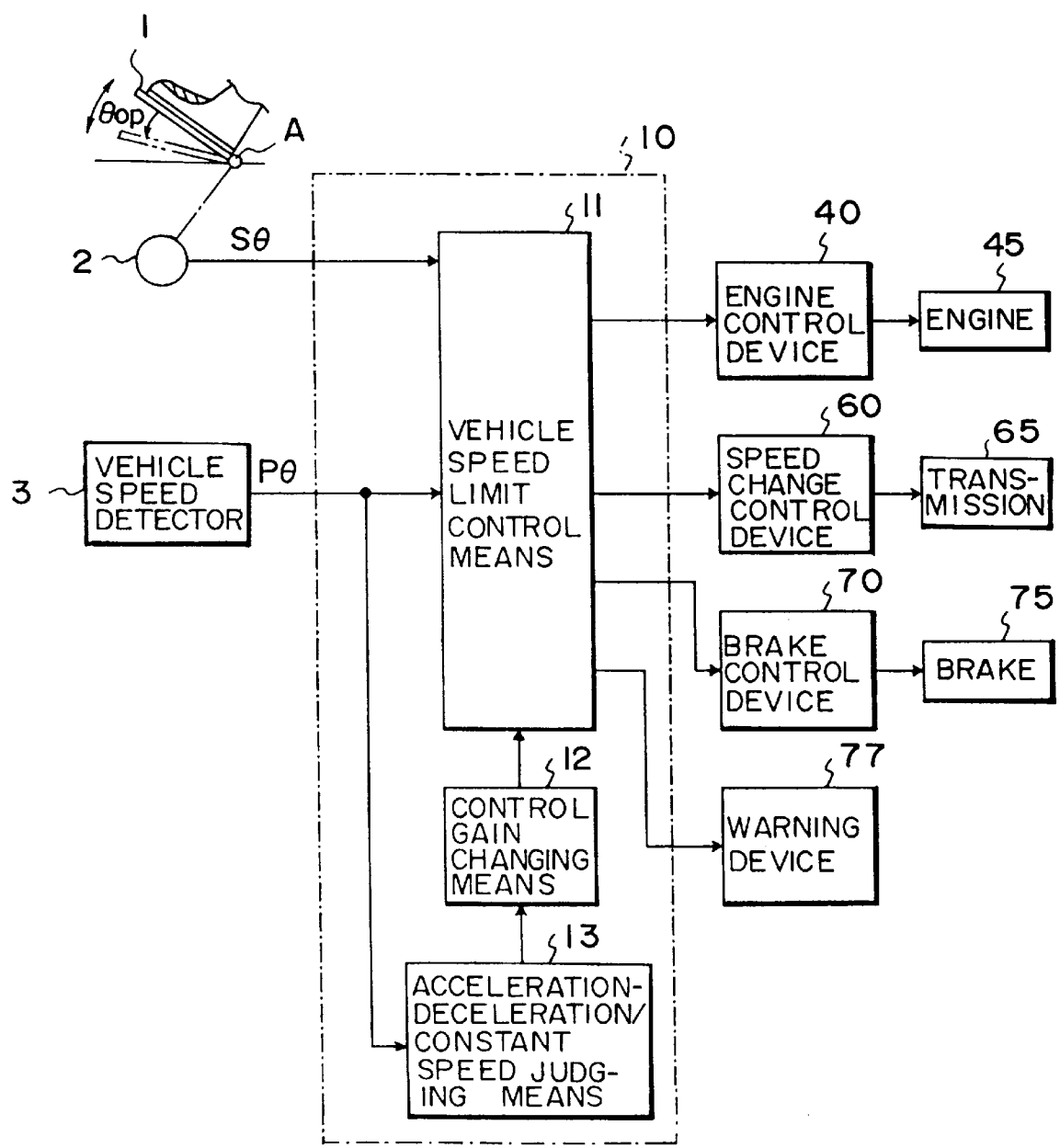
FIG. 1 is a basic block diagram of a vehicle speed limiting apparatus according to a first embodiment of the present invention.

FIG. 1 illustrates a vehicle speed limiting apparatus of a first embodiment. A vehicle speed control device 10 is composed of a vehicle speed limit control means 11, a control gain changing means 12, and an acceleration-deceleration/constant speed judging means 13. A depressing stroke amount (hereinafter, referred to as a stroke amount) of an accelerator pedal 1 is inputted to the vehicle speed limit control means 11 through an accelerator pedal depressing stroke detector 2 (hereinafter, referred to as a stroke detector 2). A vehicle speed signal from a vehicle speed detector 3 is inputted to the vehicle speed limit control means 11 and the acceleration-deceleration/constant speed judging means 13. The vehicle speed limit control means 11 controls an engine 45, a transmission 65 and a brake 75 through an engine control device 40, a speed change control device 60, and a brake control device 70, respectively.

The accelerator pedal 1 is used for accelerating a working vehicle, and is usually placed in front of a driver's seat so as to be operated by the driver's foot. The stroke amount by which the accelerator pedal 1 is depressed causes the rotation of the engine 45 in proportion to a fuel injection amount to the engine 45. The engine speed is determined in a state such that the torque required for the vehicle, which is determined by the traveling resistance and the magnitude of the load, and the engine output torque are in balance, and the vehicle can run at the vehicle speed in proportion to this engine speed. The stroke detector 2 is a sensor for detecting a stroke amount of the accelerator pedal 1. In this embodiment, the stroke amount is detected as a rotation angle when the accelerator pedal 1 rotates about a fulcrum A. The vehicle speed detector 3 detects the vehicle speed of the working vehicle.

Although the vehicle speed control device 10 in this embodiment is composed of the vehicle speed limit control means 11, the control gain changing means 12, and the acceleration-deceleration/constant speed judging means 13, it can be composed of the vehicle speed limit control means 11 alone.

The vehicle speed limit control means 11 inputs a depressing stroke signal and a vehicle speed signal, and outputs the inputted depressing stroke signal to the engine control device 40 when the vehicle speed signal is smaller than the vehicle speed limit value. On the other hand, when the vehicle speed signal once becomes larger than the vehicle speed limit value, the vehicle speed limit control means 11 corrects the input depressing stroke signal so that a deviation value between the vehicle speed signal and the vehicle speed limit value becomes smaller, and outputs the corrected depressing stroke signal to the engine control device 40 as a new depressing stroke signal.

The acceleration-deceleration/constant speed judging means 13 judges whether the present vehicle speed is in a stable vehicle speed period or in an acceleration-deceleration period while the vehicle speed limit control means 11 is correcting the depressing stroke signal in order to limit the vehicle speed. The result of the judgment is outputted to the control gain changing means 12. The control gain changing means 12 inputs the result of the judgment as to whether it is the stable vehicle speed period or the acceleration-deceleration period, and outputs a control gain suited thereto to the vehicle speed limit control means 11. The engine control device 40 inputs the depressing stroke signal or the corrected depressing stroke signal, controls the fuel injection, so that the fuel injection amount corresponding to the stroke amount and the fuel injection timing corresponding to the engine speed at that time can be obtained, and supplies fuel to the engine 45. The engine 45 is caused to be rotated by the supplying of the fuel.

The speed change control device 60 inputs switching vehicle speed data obtained when downshifting or upshifting corresponding to each speed stage, and the present vehicle speed data from the vehicle speed limit control means 11, and compares the switching vehicle speed data and the present vehicle speed data to judge whether an upshift or a downshift should be done. When downshifting or upshifting should be done, the speed change control valve is switched so that the corresponding speed stage is achieved, and the transmission 65 is controlled.

The brake control device 70 inputs a brake operating signal from the vehicle speed limit control means 11, and actuates a brake control valve based on that signal to control the brake 75. A warning device 77 inputs a warning signal from the vehicle speed limit control means 11, and gives a warning to a driver based on the warning signal. It is preferable that the warning device 77 includes a buzzer sound, a warning voice, a warning lamp, or a warning message display, etc., and is located at a position where the driver can easily check warning contents while driving.

Figure 2:
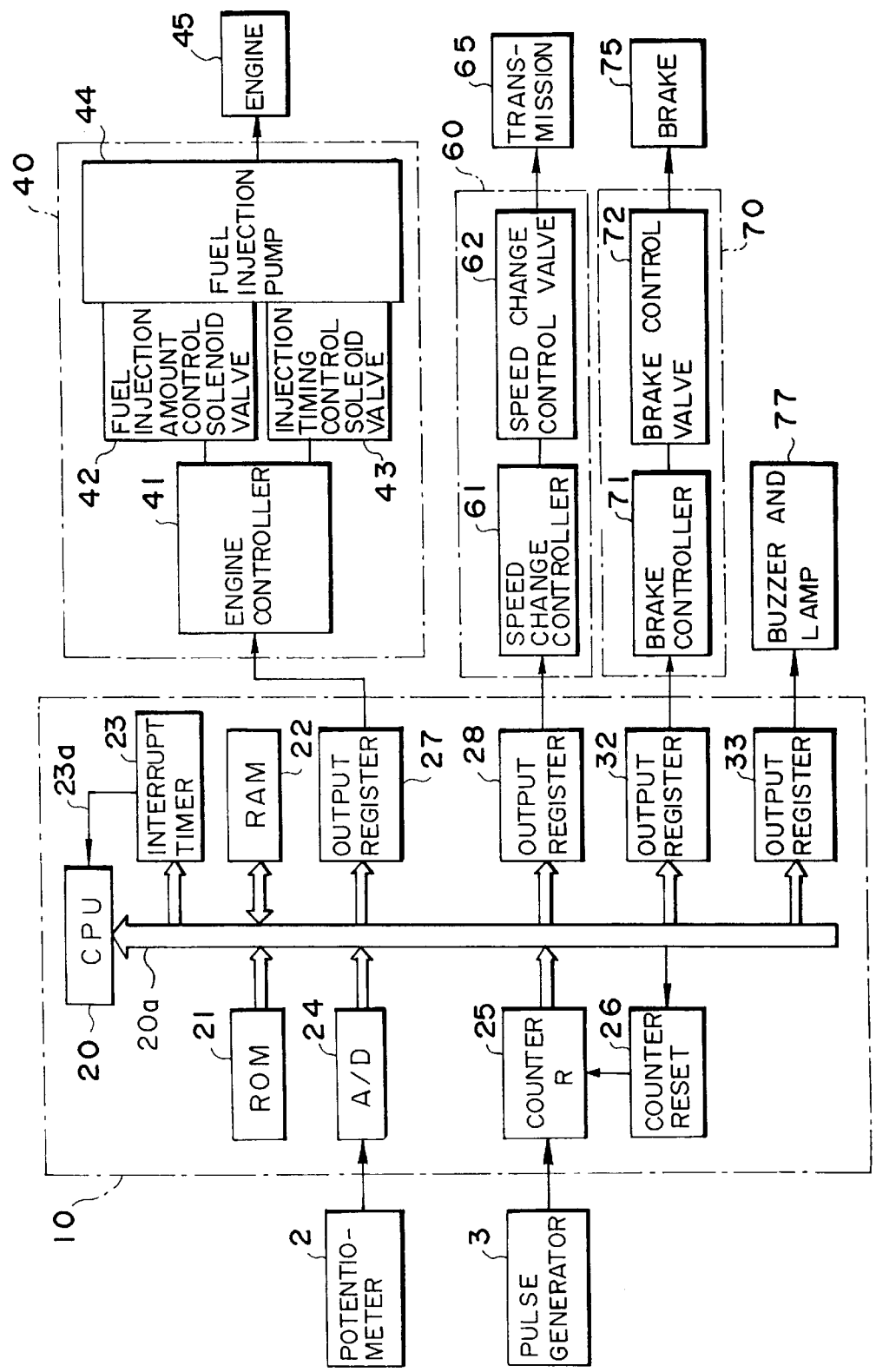
FIG. 2 is a specific circuit block diagram of a vehicle speed limit control device according to the first embodiment of the present invention.

Referring to FIG. 2, a potentiometer, which is an example of the stroke detector 2, is mounted on a predetermined position where it rotates in synchronism with the rotation fulcrum A of the accelerator pedal 1. A rotation range of the potentiometer 2 is adjusted and fixed so that the output voltage of the potentiometer 2 is proportional to the stroke amount.

In addition, a pulse generator is used as a vehicle speed detector 3, and is fixed to a shaft which rotates in synchronism with the rotation shaft of the driving rear wheels 84. The pulse generator 3 outputs a pulse train such that a pulse number per unit time is proportional to the number of rotations per unit time of the input rotation axis. By counting the output pulse number per unit time, the number of rotations per unit time of the driving rear wheels 84 can be calculated to detect the vehicle speed.

The engine control device 40 is composed of an engine controller 41, a fuel injection amount control solenoid valve 42, a fuel injection timing control solenoid valve 43, and a fuel injection pump 44. The engine controller 41 inputs a depressing stroke signal (hereinafter, referred to as a stroke signal), or a corrected depressing stroke signal (hereinafter, referred to as a corrected stroke signal) from the vehicle speed limit control means 11, and inputs a speed signal of the engine 45 from an engine speed detector (not shown). The engine controller 41 calculates the fuel injection amount equivalent to the stroke amount, and at the same time, calculates the fuel injection timing suited to the engine speed at that time to output a fuel injection amount signal and a fuel injection timing signal to the fuel injection amount control solenoid valve 42 (hereinafter, referred to as the fuel injection amount control valve 42) and the fuel injection timing control solenoid valve 43 (hereinafter, referred to as the fuel injection timing control valve 43), respectively.

Each of the fuel injection amount control valve 42 and the fuel injection timing control valve 43 is a proportional solenoid valve for outputting a hydraulic flow rate proportional to the magnitude of the current of an input signal. The arrangement is such that the fuel injection amount from the fuel injection pump 44 is set in proportion to the output hydraulic flow rate of the fuel injection amount control valve 42. In addition, the fuel injection timing from the fuel injection pump 44 is set in proportion to the output hydraulic flow rate of the fuel injection timing control valve 43.

The speed change control device 60 is composed of a speed change controller 61 and a speed change control valve 62. The speed change controller 61 inputs switched vehicle speed data obtained when upshifting or downshifting corresponding to each speed stage, and the present vehicle speed data from the vehicle speed limit control means 11, and compares the switched vehicle speed data and the present vehicle speed data to judge whether the upshift or downshift should be done. When the upshift or downshift should be done, it outputs the corresponding speed stage signal to the speed change control valve 62. The speed change control valve 62 is a switching solenoid valve which is actuated based on the speed stage signal, and it switches the speed stage of the transmission 65.

The brake control device 70 is composed of a brake controller 71, and a brake control valve 72. The brake controller 71 inputs a brake actuating signal from the vehicle speed limit control means 11, and actuates the brake control valve 72 based on that signal to control the brake 75. The brake 75 is generally used for continuously controlling a traveling vehicle speed of the working vehicle. In this embodiment, a retarder brake is adopted. The retarder brake is actuated by oil pressure or air pressure. When the retarder brake is controlled in multiple stages, a servo valve is used as the brake control valve 72 to control the flow rate in an analog fashion. When performing ON/OFF control, a normal switching valve can be used for the brake control valve 72. The warning device 77 is composed of a warning buzzer and a lamp. In order to call attention to a driver while driving, the warning is preferably provided through vision and hearing.

The vehicle speed control device 10 is, as shown in FIG. 2, composed of a general microcomputer system. A CPU 20 is a microcomputer which is the essential part of the microcomputer system, and is a general one including therein a storage device, a processor, an executing device, and an input/output interface part, etc. An ROM 21 stores a system program for determining an execution sequence of the system. A RAM 22 is a normal random access memory which can freely execute reading and writing, in which data for use in controlling the vehicle speed, such as control constant of the vehicle speed limit value and the control gain, and temporary data for use in calculation and control are stored. The CPU 20 exchanges each of the data with the ROM 21, RAM 22, and other peripheral data input/output interface parts through a data and control bus 20a.

An interrupt timer 23 outputs an interrupt signal to the CPU 20 at each predetermined time interval. Upon receipt of the interrupt signal 23a, the CPU forcibly suspends current process execution, and preferentially handles the interrupt corresponding to the interrupt signal 23a, and after the completion of the interrupt handling, restarts the suspended original process. The above predetermined time value for determining the time intervals of the interrupt is set by an initialization program which is run immediately after power-up.

An A/D converter 24 (hereinafter, referred to as A/D 24) converts an analog voltage signal, from the potentiometer 2 for detecting the stroke amount, into digital form, and the digital value is outputted to the CPU 20 through the bus 20a. If the number of output bits of the digital value is increased, the stroke amount can be detected accurately and the corrected amount of the stroke signal can be calculated in detail, so the vehicle speed control can be effected smoothly.

A counter 25 inputs a pulse train from the pulse generator 3, and counts the number of pulses. The counted value is outputted to the CPU 20 through the bus 20a. The CPU 20 generates a periodic interrupt signal 23a at each unit time using the interrupt timer 23, inputs the counted value during the handling of the interrupt, and at the same time, outputs a reset command to a counter reset 26. Upon receipt of the reset command, the counter reset 26 outputs a single reset pulse to the counter 25 to return the counted value data to zero. The counter 25 restarts counting of the number of pulses from the pulse generator 3, and continues the above repeatedly. Since the counted value input to the CPU 20 is equivalent to the number of rotations of the driving rear wheels 84 per unit time, the traveling distance per unit time, i.e., the vehicle speed can be calculated using the length of the tire diameter of the driving rear wheel 84.

An output register 27 (hereinafter, referred to as a register 27) outputs the stroke signal or the corrected stroke signal to the engine controller 41, and the number of the output bits is preferably larger than the number of the output bits of the digital value of the stroke amount converted by the A/D 24. An output register 28 (hereinafter, referred to as a register 28) outputs switched vehicle speed data when downshifting and upshifting, and the present vehicle speed value data to the speed change controller 61. An output register 32 (hereinafter, referred to as a register 32) outputs a brake actuating signal to the brake controller 71. As described above, it is necessary to increase the number of output bits when accurately and smoothly effecting a brake control.

An output register 33 (hereinafter, referred to as a register 33) outputs the warning signal to the warning device 77. In this embodiment, the warning buzzer and the lamp are used in the warning device 77, so the output of at least 1 bit can be used as the warning signal. When a character display and a graphic display are used for the warning device 77, many warning message data, etc., must be outputted. However, if the transmission of the warning signal is effected by means of serial communication, for example, the distribution cable to the warning device 77 can be simplified.

Next, an operation of the vehicle speed limiting device in the first embodiment will be described.

Main functions regarding the vehicle speed limit in which the microcomputer system is mainly used are listed below.
(1) Equivalent of the Vehicle Speed Limit Control Means 11:

The vehicle speed pulse counted value is inputted through the counter 25, and the vehicle speed is calculated to write the vehicle speed value into a predetermined address in the RAM 22. In addition, the depressing angle of the accelerator pedal 1 is inputted through the A/D 24. The vehicle speed limit value or a predetermined vehicle speed threshold value stored in the RAM 22 is read out to be compared with the above vehicle speed. When the vehicle speed is smaller, the depressing angle data is outputted to the register 27 to control the fuel injection amount of the engine 45.

When the vehicle speed becomes larger than the vehicle speed limit value or the predetermined vehicle speed threshold value, a correction value of the depressing angle data outputted last time is calculated so that a deviation between the vehicle speed and the vehicle speed limit value becomes smaller, and the corrected depressing angle data are outputted to the register 27. At this time, a control gain value for calculating the correction value of the depressing angle data is read out of the predetermined address in the RAM 22. The above process is repeated during the vehicle speed limit traveling. When a period in which the vehicle speed limit traveling should be done terminates and it is judged that a shifting to the accelerated traveling should be done, the actual depressing angle data is outputted to the register 27.
(2) Equivalent of the Acceleration-Deceleration/Constant Speed Judging Means 13:

The vehicle speed value and the vehicle speed limit value stored in the RAM 22 are read out to calculate a deviation therebetween. When the deviation value is less than or equal to a predetermined value and continues for a predetermined time or more, the stable vehicle speed period is judged. When other than the stable vehicle speed period, the acceleration-deceleration period is judged. These results of judgment are written into the predetermined addresses in the RAM 22.
(3) Equivalent of the Control Gain Changing Means 12:

The results of judgment of the stable vehicle speed period and the acceleration-deceleration period are read out, and the control gain values corresponding to the results of judgment are written into the predetermined addresses in the RAM 22.

Figure 4:
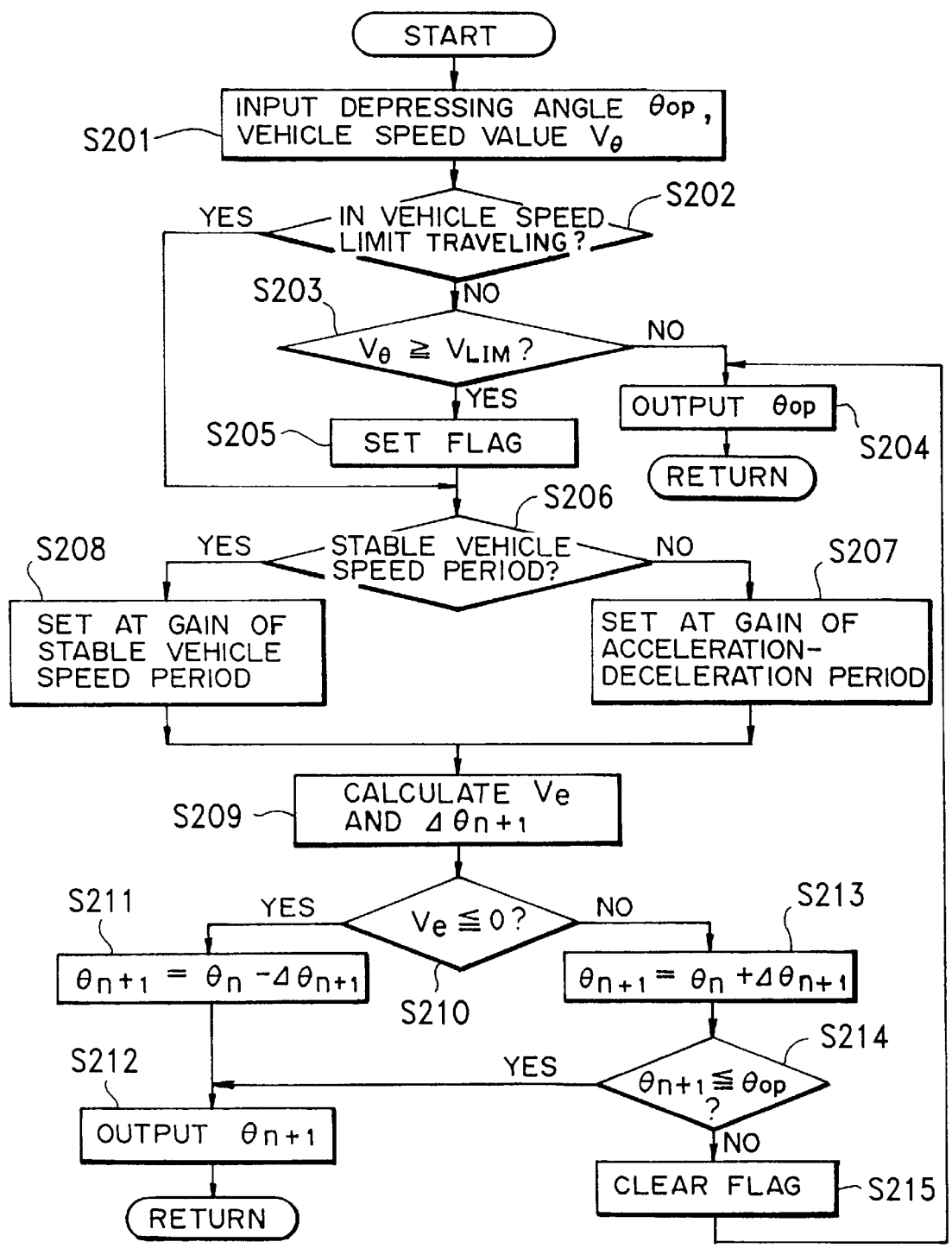
FIG. 4 is a flowchart of vehicle speed limit control according to the first embodiment.

The above (1) to (3) will be described in detail. In the RAM 22, temporary data, etc., used for each control constant and control are stored. For the purpose of description, these data are assumed to be stored in addresses shown in FIGS. 3A and 3B, and the first address of these data is assumed to be an address of F. The actual accelerator pedal depressing angle is taken as θop, as shown in FIG. 1. Further, FIG. 4 shows a control flow when the vehicle speed threshold value, which is a criterion of judgment for shifting to the vehicle speed limit traveling, is equalized to the vehicle speed limit value. The vehicle speed limit control flow will be described with reference to FIGS. 1 to 4. Incidentally, in each step, "step" is represented as "S", for example, "step 201" is indicated as "S201".

S201: Now, assume that the vehicle starts from the stopped state, and the accelerator pedal 1 is depressed to the depressing angle θop. Since a voltage Sθ proportional to the depressing angle θop is outputted from the stroke detector 2 (potentiometer), the CPU 20 inputs the voltage Sθ through the A/D 24. At the same time, the CPU 20 inputs a counted value of the pulse train Pθ from the vehicle speed detector 3 (pulse generator) from the counter 25. The CPU 20 calculates a travel distance per unit time from the calculated value of the pulse train Pθ and tire diameter data of the driving rear wheel stored in a predetermined address in the RAM 22 to provide a vehicle speed value Vθ. The vehicle speed value Vθ is primarily stored in a predetermined address in the RAM 22.

S202: Whether during the vehicle speed limit traveling or not is judged, and a procedure advances to S206 if during the vehicle speed limit traveling. If not, the procedure advances to S203. At the point of the start, the procedure advances to S203.

S203: The vehicle speed limit value (hereinafter, referred to as VLIM) in the predetermined address in RAM 22 is compared with the vehicle speed value Vθ. When Vθ is smaller than VLIM, the procedure advances to S204, while the procedure advances to S205 when Vθ is equal to or greater than VLIM.

S204: This process is the process during the accelerated traveling. That is, the depressing angle data θop, which is equivalent to the input voltage Sθ, is inputted to the register 27. Thereafter, the process by the CPU returns to S201. This process is further described. When the depressing angle data θop is outputted to the register 27, the engine controller 41 converts the fuel injection amount command equivalent to the depressing angle data θop into a current command and outputs to the fuel injection amount control valve 42. In addition, the engine controller 41 calculates the fuel injection timing corresponding to the engine speed value inputted from an engine speed sensor (not shown), and converts a fuel injection timing command equivalent to the fuel injection timing data into a current command and outputs to the fuel injection timing control valve 43. The fuel injection by the fuel injection pump 44 to the engine 45 is controlled by the fuel injection control valve 42 and the fuel injection timing control valve 43. Therefore, the engine 45 rotates according to the fuel injection amount to offer the speed such that the torque required for vehicle traveling, traveling resistance, etc., and the engine output torque are in balance. The vehicle speed gradually increase in this way. When the accelerator pedal 1 is slowly depressed to the angle θop, the vehicle speed is smoothly increased so as to approximately respond thereto.

S205: The vehicle speed limit traveling state is set. In order to switch the subsequent processes to the vehicle speed limit control process, a flag is written into a predetermined address in the RAM 22 during the vehicle speed traveling, and then the procedure advances to S206.

S206: It is judged whether the behavior of the vehicle speed control is the stable vehicle speed period or the acceleration-deceleration period. In this embodiment, the judgment is made, as described below, with the magnitude of the deviation of the vehicle speed and the elapsed time of a period in which the deviation is regarded as small. That is, a deviation value Ve between the vehicle speed limit value VLIM and the vehicle speed value Vθ is first obtained by the expression "Ve=VLIM−Vθ", and the vehicle speed deviation value Ve is written into a predetermined address in the RAM 22. Then, it is compared to determine whether or not an absolute value of the deviation value Ve is smaller than a predetermined value Vα (positive constant). When the absolute value of the deviation value Ve is smaller than the predetermined value Vα, the elapsed time in that condition is measured. When the elapsed time becomes larger than a predetermined time tα, the vehicle speed is regarded as entering the stable vehicle speed period. When the above-described condition is not satisfied, it is regarded as the acceleration-deceleration period. This result of judgment is written into a predetermined address in the RAM 22 as an acceleration-deceleration judgment result flag. Based on the acceleration-deceleration judgment result flag, the procedure advances to S208 if the stable vehicle speed period, while the procedure advances to S207 if the acceleration-deceleration period. Incidentally, the elapsed time can be easily measured when the interrupt timer 23 is used. In other words, the timer 23 is started from the point of time where the absolute value of the deviation value Ve becomes smaller than the predetermined value Vα, and the number of periodic timer interruptions 30 during the elapsed time is counted on the program, thereby enabling the calculation of the final elapsed time.

S207: A control gain of the acceleration-deceleration period is read from a predetermined address in the RAM 22, and the control gain is written into a predetermined address in the RAM 22 in which a control gain Kθ during the vehicle speed limit is stored, whereby the control gain during the acceleration-deceleration period can be set as the control gain Kθ during the vehicle speed limit. Usually, the control gain of the acceleration-deceleration period is set to a suitably large value. Next, the procedure advances to S209.

S208: In this step, as in the case of S207, the control gain of the constant vehicle speed period in the RAM 22 is read, and the control gain is written into a predetermined address in the RAM 22 in which the control gain Kθ during the vehicle speed limit is stored, whereby the control gain of the stable vehicle speed period is set. Usually, the control gain of the stable vehicle speed period is set to a suitably small value. Next, the procedure advances to S209.

S209: A deviation value Ve (=VLIM−Vθ) between the vehicle speed limit value VLIM and the vehicle speed value Vθ is obtained. In this embodiment, however, since the deviation value has already been stored in the predetermined address in the RAM 22 in S206, this deviation value Ve can be used. Incidentally, the CPU 20 performs the vehicle speed limiting process at fixed periods. Now, the depressing angle data which are calculated at the preceding n-th periodic process to be outputted to the register 27 are taken as Δθn, and a correction value at that time is taken as Δθn. In the n+1-th periodic process of this time, a correction value Δθn+1 of the depressing angle data is obtained by the expression "Δθn+1=Kθ×Δθmin". Here, Kθ is the control gain during the vehicle speed limit obtained in S207 or S208, and is read from the predetermined address in the RAM 22. Δθmin is a predetermined minimum correction amount unit for obtaining the correction value Δθn+1. Next, the procedure advances to S210.

S210: When the deviation value Ve obtained in S206 or S207 satisfies the expression "Ve=VLIM−Vθ≦0", the procedure advances to S211. If the expression is not satisfied, the procedure advances to S213.

S211: A state where the vehicle speed value Vθ is over the vehicle speed limit value VLIM, and deceleration is required. Thus, the depressing angle data θn+1 in the n+1-th periodic process of this time is corrected by the expression "θn+1=θn−Δθn+1", and outputted to the register 27. Here, although En is the depressing angle data written into the RAM 22 during the preceding output, the initial one is taken as θop. In addition, θn+1 is written into a predetermined address in the RAM 22 for use in the next time. Next, the procedure advances to S212.

S212: The obtained depressing angle data θn+1 is outputted to the register 27. This terminates the periodic process of this time, and the next periodic process is started from S201.

S213: The state of this time is a state where the vehicle speed value Vθ is lower than the vehicle speed limit value VLIM, and acceleration is required. Thus, the depressing angle data θn+1 of the n+1-th periodic process of this time can be obtained by the expression "θn+1=θn +Δθn+1". Next, the procedure advances to S214.

S214: The vehicle speed limit traveling is terminated, and it is judged whether or not shifting to the accelerated traveling is required. That is, in the state where the vehicle speed value Vθ is lower than the vehicle speed limit value VLIM, the actual depressing angle θop may become small. In addition, a traveling load is large due to an uphill grade, etc., so that the engine output command equivalent to the actual depressing angle eop cannot produce a torque larger than the traveling load. Thus, in this embodiment, it is judged whether the calculated n+1-th depressing angle data is smaller than the actual depressing angle θop. If smaller, the procedure advances to S212 to continue the previous vehicle speed limit traveling. If larger, the procedure advances to S215 to terminate the vehicle speed limit traveling.

S215: The vehicle speed traveling flag is cleared, the process shifts to the accelerated traveling process after the next periodic process.

The flow of the process for vehicle speed limit traveling will be specifically described with reference to the control flow as described above. FIGS. 5A and 5B schematically illustrate the time progress of the actual depressing angle θop, and the changes in the vehicle speed with respect to it when the vehicle is started from the stopped condition, the accelerator pedal 1 is gradually depressed to the depressing angle θs and subsequently is further depressed to the depressing angle θa. In this way, when the accelerator pedal 1 is slowly depressed to the angle θs, the vehicle speed Vs equivalent to the angle θs is smaller than the vehicle speed limit value VLIM, so that the process of the control flow advances in the order of S201 to S204, and the vehicle is smoothly accelerated while performing a normal accelerated traveling. After the vehicle speed has reached Vs, the accelerated traveling at the vehicle speed Vs is performed.

Next, it is assumed that the accelerator pedal 1 is suddenly depressed from the depressing angle θs to the depressing angle θa, and the vehicle speed Va equivalent to the depressing angle θa is larger than the vehicle speed limit value VLIM.

In the starting stage of acceleration, the vehicle speed value is smaller than the vehicle speed limit value VLIM, so the process advances in the order of S201 to S204, as described above. The CPU 20 outputs the depressing angle data Vθa, equivalent to the voltage Sθa, to the register 27. Since the engine control device 40 correspondingly rapidly increases the engine speed, the vehicle speed is increased to become the vehicle speed Va.

When the vehicle speed value Vθ becomes larger than the vehicle speed limit value VLIM (S203) in the course of the above-described acceleration, the vehicle speed limit traveling state is set, and the procedure advances to S205, and S206. The early stage of the vehicle speed limit traveling state set from the accelerated traveling is regarded as the acceleration-deceleration period, as shown in FIG. 5B. Thus, the procedure advances to S207. Further, the procedure advances to S209 to S212, and each of S201, S202, S206, and S207 to S212 is repeated from the start of the next periodic process.

At this time, the vehicle speed value Vθ, as shown in FIG. 5B, once exceeds the vehicle speed limit value VLIM, then decreases gradually, and becomes lower than the vehicle speed limit value VLIM at a certain point in time. Thus, after this, the procedure advances from S209 to S210, and branches to S213 to advance to S214 and S212, and from the start of the next periodic process, the process is repeated in the order of S201, S202, S206, S207, S209, S210, S213, S214, and S212.

Incidentally, in the course of deceleration, the vehicle speed Vθ may become lower than VLIM+Vα, and the absolute value of the deviation may become smaller than Vα. From this point of time, the measurement of the elapsed time for judging whether the vehicle speed enters the stable vehicle speed period is started in S206. Since the vehicle speed is increased again by the process of S213, the vehicle speed gradually increases, and becomes larger than the vehicle speed limit value in the course of increasing. In this process, when the vehicle speed Vθ does not become smaller than VLIM−Vα since the elapsed time in the stable vehicle speed period has began to be measured in S206, and the measured elapsed time becomes the predetermined time tα or longer, it is regarded as the stable vehicle speed period. Then, the process advances to S201, S202, S206 to S208, and S209, and the control gain of the stable vehicle speed period is selected as the control gain Kθ at the time of limiting the vehicle speed.

If the absolute value of the vehicle speed deviation becomes larger than Vα due to an abrupt load fluctuation during the vehicle speed limit control, the control gain is immediately switched at that point of time to the control gain of the acceleration-deceleration period so that the vehicle speed deviation becomes smaller in a short period of time. Thus, the response of the vehicle speed control with respect to the abrupt load fluctuation is improved. In the manner as described above, the vehicle speed stabilizes while gradually converging on the vehicle speed limit value VLIM.

When the driver gradually returns the accelerator, the actual depressing angle θop becomes small until the calculated n+1-th depressing angle data θn+1 becomes larger than the actual depressing angle θop. At this time, the process advances from S214 to S215 to terminate the previous vehicle speed limit traveling. Thereafter, the traveling is shifted again to the traveling by the actual depressing angle θop, so-called accelerated traveling.

In this embodiment, for the purpose of simplifying the explanation, the vehicle speed threshold value of a criterion of judgment for shifting from the accelerated traveling to the vehicle speed limit traveling is equalized to the vehicle speed limit value VLIM. At this time, as is evident from FIG. 5B, the vehicle speed Vθ always exceeds the vehicle speed limit value VLIM. Therefore, in order to reduce the overshoot amount of the vehicle speed Vθ to promptly converge the vehicle speed Vθ on the vehicle speed limit value, the vehicle speed threshold value of the criterion of judgment for shifting to the vehicle speed limit traveling can be set to a value smaller than the target vehicle speed limit value VLIM (VLIM−Vβ). Here, Vβ is taken as a positive integer larger than Vα.

In this case, it is judged whether or not the vehicle speed Vθ is larger than (VLIM−Vβ). If larger, it is regarded that Vθ enters the vehicle speed limit traveling period. Thereafter, each of the control gains corresponding to the acceleration-deceleration period and the stable vehicle speed period are obtained, and the correction value Δθn+1 of the depressing angle data of the n+1-th periodic process. At this time, the correction value Δθn+1 is obtained in consideration of the magnitude of the deviation value of the vehicle speed and the acceleration. For example, when the deviation value is small but the acceleration is large, the correction value Δθn+1 is set rather large to converge the vehicle speed Vθ earlier. Then, as in the case of the above description, θn+1 is obtained from Δθn+1 and is outputted. Incidentally, the acceleration is calculated from the vehicle speed signal, and is calculated as an amount of change in the vehicle speed per unit time. On the other hand, when the vehicle speed Vθ is smaller than (VLIM−Vβ), the traveling is shifted to the accelerated traveling to output the actual depressing angle θop.

In this way, when the vehicle speed Vθ approaches the vehicle speed limit value VLIM and exceeds (VLIM−Vβ), the vehicle speed limit can be performed earlier. Thus, the vehicle speed does not greatly exceed the vehicle speed limit value VLIM.

As described above, according to the first embodiment, the stable vehicle speed period and the acceleration-deceleration period are discriminated and a control gain Kθ suited to the period is used for the vehicle speed limit control, so that the response during the vehicle speed limit control is good. In addition, the vehicle speed can be controlled by the fixed control gain Kθ without discriminating between the stable vehicle speed period and the acceleration-deceleration period. In this case, since the control gain changing means 12 and the acceleration-deceleration/constant speed judging means 13 are not provided, the vehicle speed limit control means 11 is equivalent to the vehicle speed control device 10. That is, the vehicle speed limit control means 11 has each control constant shown in FIGS. 3A and 3B required for the vehicle speed limit control, and can perform a control in accordance with the above flow. In addition, when the vehicle speed threshold value of the criterion of judgment for shifting to the vehicle speed limit traveling is set to the value lower than the target vehicle speed limit value VLIM, i.e., (VLIM−Vβ), the vehicle speed can be promptly converged on the vehicle speed limit value by decreasing the overshoot amount thereof.

The output value of the depressing angle data in each periodic process is obtained by correcting the preceding output value by a very small amount in a direction to reduce the vehicle speed deviation. Since the control response is affected by the magnitude of the correction amount, it is necessary to calculate the correction value suited to the control. For example, in the above S209, assume that the predetermined minimum correction amount unit $\Delta\theta$min for obtaining the correction is set to a small value to the extent that the control does not become unstable. At this time, if the actual depressing angle is considerably larger than the depressing angle equivalent to the vehicle speed limiting speed, it is conceivable that the time, until the vehicle speed stabilizes at the vehicle speed limiting speed, is required even if the output value of the depressing angle data is corrected by the small minimum correction amount unit $\Delta\theta$min.

Therefore, if the minimum correction amount unit $\Delta\theta$min is calculated corresponding to the width of the actual depressing angle, an improvement in response can be achieved. For example, the minimum correction amount unit $\Delta\theta$min can be obtained by the expression "$\theta op/K$" with respect to the actual depressing angle $\theta op$. Here, K is a positive integer considering stability of the vehicle speed control and is obtained experimentally. According to the experiment made by the present inventors, it is confirmed that when the constant K is set to an optimum value, the response is remarkably improved relative to a case when the small minimum correction amount unit $\Delta\theta$min is used.

When traveling on a steep downhill, the vehicle is accelerated due to the vehicle weight without depressing the accelerator pedal 1, and the so-called coasting state develops. Particularly, since the dump truck transports heavy cargo such as earth and sand, the coasting state is likely to develop. If the coasting state develops during the vehicle speed limit, the vehicle speed value may exceed the vehicle speed limit value even though the corrected depression angle data is outputted by zero, i.e., even though the accelerator stopping signal is outputted. When this uncontrollable state of the vehicle speed limit begins, the CPU 20 starts to measure duration thereof using the interrupt timer 23. When continued for a predetermined time, the CPU 20 outputs an actuating command of the buzzer and the lamp 77 to the register 33 so as to inform the driver of the uncontrollable state of the vehicle speed limit.

Further, when the vehicle speed limit by only the engine control is impossible in the coasting state, a downshifting of the speed change stage and an actuation of the brake enable an accurate control of the vehicle speed limit. In addition, during the vehicle speed limit control, the braking force becomes larger when hard upshifting of the speed stage is caused to maintain the present vehicle speed stage, so the vehicle speed limit can easily be controlled.

For example, when the CPU 20 outputs the brake actuating command data to the register 32, the brake controller 71 actuates the brake control valve 72 to apply the brake 75, so that the vehicle speed decreases gradually. Thereafter, the vehicle speed reaches a predetermined vehicle speed and the CPU 20 outputs downshift judging vehicle speed value data, which are larger than the present downshift judging vehicle speed value data, to the register 28. The speed change controller 61 judges that the downshifting should be done earlier than the normal downshifting time, and actuates the speed change control valve 62 to downshift the transmission 65. This can provide larger braking torque at the time of engine control, so that the vehicle speed can be limited frequently even in the coasting state.

In addition, the CPU 20 outputs upshift judging vehicle speed value data, which are larger than the present upshift judging vehicle speed value data, to the register 28. By this output, the speed change controller 61 judges that the upshifting should be done later than the normal upshifting time, so that a hard upshifting is caused and the present speed stage of large braking torque can be maintained.

Next, a second embodiment according to the present invention will be described. This embodiment is an example when the dump truck is systematically operated.

Figure 6:
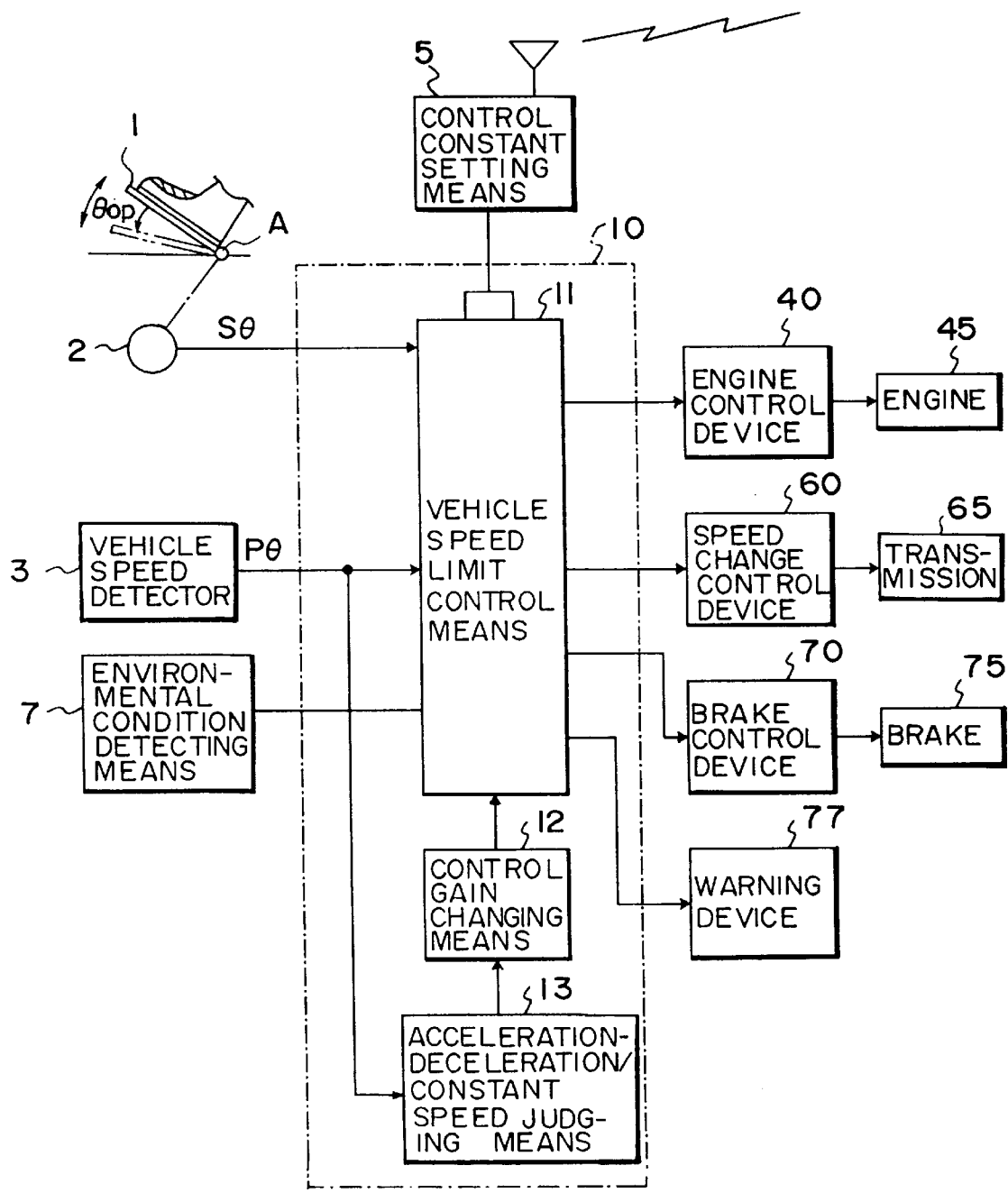
FIG. 6 is a basic block diagram of a vehicle speed limiting apparatus according to a second embodiment of the present invention.
Figure 7:
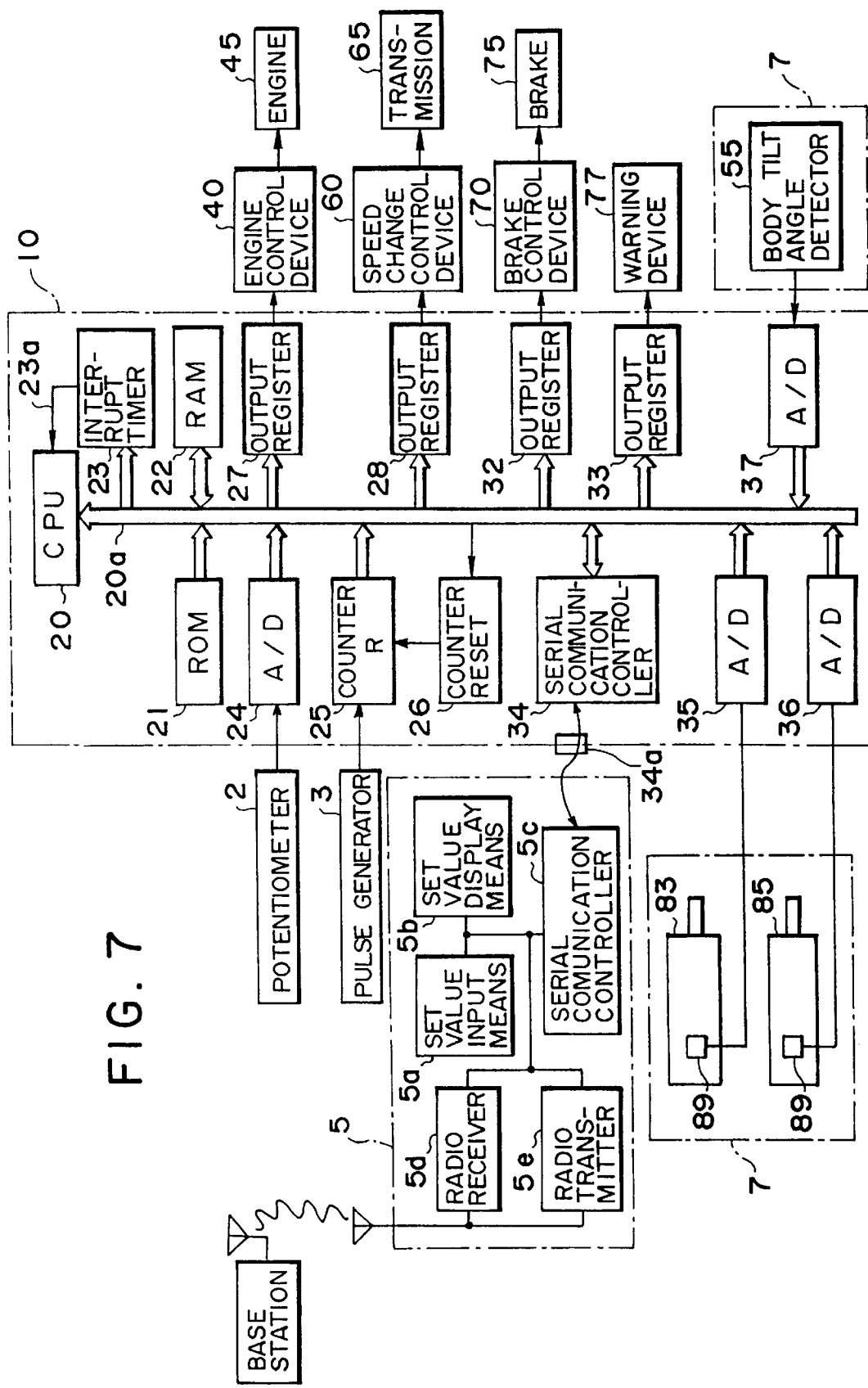
FIG. 7 is a specific circuit block diagram of a vehicle speed limit control device according to the second embodiment of the present invention.

Referring to FIGS. 6 and 7, although the basic construction is the same as that of the first embodiment, in order to efficiently perform system management and operation management, a control constant setting means 5 is provided which can arbitrarily input control constant data, or send and receive the control constant data by radio with an outside base station. In addition, in order to perform the vehicle speed limit control suited to an external environmental condition, an external environmental condition detecting means 7 is provided. The control constant setting means 5 and the external environmental condition detecting means 7 are attached to the vehicle speed limit control means 11. Here, these characteristic means are described.

The control constant setting means 5 is used for setting a control constant, etc., which is provided with at least a set value input means 5a, and a set value display means 5b can be provided as needed. When numerical values are directly inputted using, for example, a key switch and a digital switch as the set value input means 5a, or they are inputted using a touch key with a display, good operability is offered. The set value display means 5b checks the above inputted set values, etc., and includes, for example, a character display or a graphic display, such as an LED display, a segment display, and a plasma display.

The control constant setting means 5 outputs an inputted set value information signal to the vehicle speed limit control means 11, and inputs a set value information signal to be displayed from the vehicle speed limit control means 11. Thus, since many set value data should be sent and received between the control constant setting means 5 and the vehicle speed control device 10, the sending and the receiving are more preferably performed by a serial communication such as an RC232C. By adopting the serial communication, a distribution cable and an interface circuit can be simplified. To this end, the control constant setting means 5 in this embodiment includes a serial communication controller 5c.

On the other hand, another serial communication controller 34 is included in the vehicle speed control device 10. The serial communication controller 34 performs the serial communication with the control constant setting means 5, and includes therein a data input/output register, a serial-parallel data conversion part, and a serial communication control part. Serially transmitted data from the control constant setting means 5 are received by the serial communication control part, and the serial data are converted into a parallel data by the serial-parallel conversion part so as to be set in the data input/output register. The CPU 20 inputs the received data through the data input/output register. Conversely, in the case of transmitting from the CPU 20, if parallel data are outputted to the data input/output register, the parallel data are converted into serial data by the serial-parallel data conversion part, and the serial data are transmitted by the serial communication control part.

In addition, the control constant setting means 5 can include a radio receiver 5d and a radio transmitter 5e in order to perform communication with an outside radio base station. Data received by the radio receiver 5d is sent to the set value display means 5b, and transmitted to the serial communication controller 34 provided in the vehicle speed control device 10 through the serial communication controller 5c. The CPU 20 reads the data from the serial communication controller 34 and writes the read data into a predetermined address in the RAM 22.

To the contrary, the CPU 20 transmits control constant data, etc., in the RAM 22 to the serial communication controller 5c through the serial communication controller 34. Such data are sent to the set value display means 5b, and are transmitted from the radio transmitter 5e to an outside station. Data inputted from the set value input means 5a is transmitted to the vehicle speed control device 10, as in the case of the first embodiment, and is transmitted to the outside station from the radio transmitter 5e.

There are various external environmental conditions for influencing characteristics of the vehicle speed limit control. For example, the typical conditions are load weight, a slip situation of tires, the situation of tires, the magnitude of a road surface grade, and the traveling resistance of the road surface. In this embodiment, an example will be described in which the load weight and the magnitude of the road surface grade are detected, and the control constant of an optimum value is selected based thereon.

Each of the suspension cylinders 83 and 85 is provided with a pressure sensor 89 as a load weight detecting means, as in the case of the conventional apparatus. In the vehicle speed control device 10, the A/C converters 35 and 36 (hereinafter, referred to as A/Ds 35, 36) for inputting an analog signal from the pressure sensor 89 are provided, and the CPU 20 inputs a pressure value of the pressure sensor 89 through the A/Ds 35 and 36. As a means for detecting the road surface gradient, a body tilt angle detector 55 is included. The body tilt angle detector 55 is provided at a predetermined position on the vehicle body 81 such that it can be regarded as being approximately equivalent to the magnitude of the road surface gradient. In the vehicle speed control device 10, an A/D converter 37 (hereinafter, referred to as an A/D 37) is provided for inputting an analog signal from the body tilt angle detector 55, and the CPU 20 receives the vehicle tilt angle from the A/D 37.

An operation of the second embodiment will now be described.

As shown in FIGS. 3A and 3B, for example, each control constant for when the load weight is within the allowable value, each control constant for when there is overloading weight, and each control constant for when a steep grade, are stored in the RAM 22. If these control constants are set to be suited for the road surface during fine weather and during rainy weather, the vehicle speed limit control can be performed more accurately. A system administrator uses the control constant setting means in order to reset the control constant such as the vehicle speed value and the control gain value during fine weather and during rainy weather. Since these control constants are written into the RAM 22, set values thereof can be freely changed. The control constant data, by being inputted with the set value input means, are transmitted from the serial communication controller 5c in the control constant setting means 5 to the serial communication controller 34 in the vehicle speed control device 10, and written into a predetermined address in the RAM 22 by the CPU 20.

Incidentally, since these control constant data are very important data relating to the control, only the system administrator should freely change them in normal times. Therefore, in order to prohibit a person other than the administrator from changing the control constant data, it is preferable that the control constant setting means 5 be removed from the vehicle speed control device 10 every day, and the control constant setting means 5 can be connected and used only when it is required by the administrator. Thus, a connector 34a is preferably provided for detaching the cables connecting the vehicle speed control device 10 and the control constant setting means 5.

A plurality of dump trucks is usually included in the system, and when setting these control constants in one operation, the control constants are inputted by radio. For example, a radio transmitter receiver of a base station is installed in a system control room established in a construction field, and the system administrator transmits the control constant data by radio from the control room to the control constant setting means 5 mounted to each dump truck. The control constant setting means 5 transmits the received control constant data to the serial communication controller 34 through the serial communication controller 5c, and the CPU 20 inputs the data for writing into predetermined addresses in the RAM 22.

In checking each of the written control constant data, by transmitting a command for data checking from the base station by radio in the same manner as described above, the set value display means 5b transmits a data requesting signal to the CPU 20 through the serial communication controller 34. Responding to this, the CPU 20 transmits the control constant data to the set value display means 5b through the serial communication controller 34, and at the same time, the set value display means 5b transmits the data to the base station through the radio transmitter 5e.

When the radio transmitter receiver is installed, communication cables of each of the control constant setting means 5 should be always connected to the vehicle speed control device 10 so that data can be received at all times. However, when the set value input means 5a is provided in the control constant setting means 5, in order to prohibit a person other than the administrator from changing the control constant data, a protective key switch, etc., should be provided so that the data cannot be changed.

In the measurement of the load weight, the CPU 20 inputs a pressure signal from the pressure sensor 89 through the A/Ds 35 and 36, at the time of loading earth and sand, to obtain the load weight based on the difference from the previously inputted pressure signal at the time of an empty load. The CPU 20 judges whether or not it is the overload weight based on the load weight signal, and if overloading, inputs a corresponding control constant from a predetermined address in the RAM 22, and performs a periodic process of the vehicle speed limit control using this control constant.

In addition, the CPU 20 inputs a body tilt angle signal from the body tilt angle detector 55 through the A/D 37 to judge the magnitude of the road surface gradient. If the steep grade is more than a predetermined value, the CPU 20 inputs the control constant corresponding to the steep grade from a predetermined address in the RAM 22 to perform a periodic process of the vehicle speed limit control using this control constant.

In this way, a vehicle speed limit control suited to the environmental conditions becomes possible.

On the other hand, in the actual vehicle speed limit traveling, there are a great many environmental conditions to be considered, and various environmental conditions are interrelated and each of the conditions are interacting with each other. For this reason, according to the control by the flow of FIG. 4, each control constant suited to the vehicle speed limit traveling in a condition where many environmental conditions are combined should be obtained in advance for each condition. However, it is predicted that a tuning operation of the control constant requires a great deal of labor and cost. If the control constant is obtained in this way, there is no guarantee that it can be tuned for an optimum value, and the behavior during the actual vehicle speed limit traveling with the use of the control constant might not become accustomed to a sensation of driving.

In such a case as described above, an application of fuzziness to the control is very effective, stable control characteristic can be obtained in a wide condition range, and the tuning operation is significantly simplified. A description will be given of the vehicle control device 10 to which fuzziness is applied. A case will be described in which in the control flow of FIG. 4, the control gain $K\theta$ used in S207 and S208, for example, is obtained, from the load weight, the vehicle speed deviation, and the acceleration, by applying fuzziness. A specific fuzzy inference is conducted by the CPU 20. For the purpose of simplifying the description, it is not particularly specified hereinbelow that the fuzzy inference is conducted by the CPU 20.

Membership functions of the load weight, the vehicle speed deviation, and the acceleration which are conditions of judgment are shown in FIGS. 8A, 8B, and 8C. The horizontal axis represents the magnitude of each condition of judgment, and the vertical axis represents the degree of normalization of each condition of judgment. In addition, FIG. 9 shows an example of rules for determining the magnitude of the control gain $K\theta$. The magnitude of each of the input load weight, the vehicle speed deviation, or the acceleration is applied to the corresponding membership function at each periodic process of each time of the vehicle control to obtain the degree of the condition at that time. By referring to the above-described rule with the use of the numerical value of the degree, the control gain $K\theta$ can be calculated by a general max-min composite centroid method. Incidentally, the measurement of the acceleration is such that the number of pulses from the vehicle speed detector 3 inputted at each periodic process is stored, and the acceleration is obtained from the difference in the number of pulses.

In addition, according to this embodiment, the reference value of the horizontal axis of each membership function is switched into two values of the constant vehicle speed period and of the acceleration-deceleration period so as to conduct the fuzzy inference. For example, the horizontal axis reference value of the vehicle speed deviation value membership function of FIG. 8A is taken as Vek, and the value of Vek is set to a rather large numerical value (for example, 4 km/h) in the case of the stable vehicle speed period, and the value of Vek is set to a rather large numerical value (for example, 2 km/h) in the case of the acceleration-deceleration period. By doing so, even at the same magnitude of the vehicle speed deviation value, the deviation is regarded as small and the control gain is calculated to be rather small in the case of the stable vehicle speed period, and the deviation value is regarded as large and the control gain is calculated to be rather large in the case of the acceleration-deceleration period. This is equivalent to the fact that the control gain is switched in the stable vehicle speed period and in the acceleration-deceleration period in the first embodiment, so that the response of the control is improved. In addition, as regards the acceleration, the load weight, etc., the control gain can be switched by switching the reference value of the horizontal axis, as in the case of the first embodiment.

According to the second embodiment as described above, by providing the radio transmitter receiver to the control constant setting means 5, the control constant suited to the external environmental condition can be arbitrarily set, in one operation and at the same time, to a plurality of systematically operated working vehicles, even if the system administrator is in the system control room far away from the working vehicles. Thus, the number of steps for changing the control constant at the time of system management can be reduced. In addition, each environmental condition is accurately recognized, and the control constant suited to the condition is used, thus enabling accurate and stable control. Further, by applying the fuzzy inference, interrelated environmental conditions can be easily calculated, and an applicable condition of possibility of the vehicle speed limit traveling is expanded.

Next, a third embodiment according to the present invention will be described with reference to the drawings.

Figure 10:
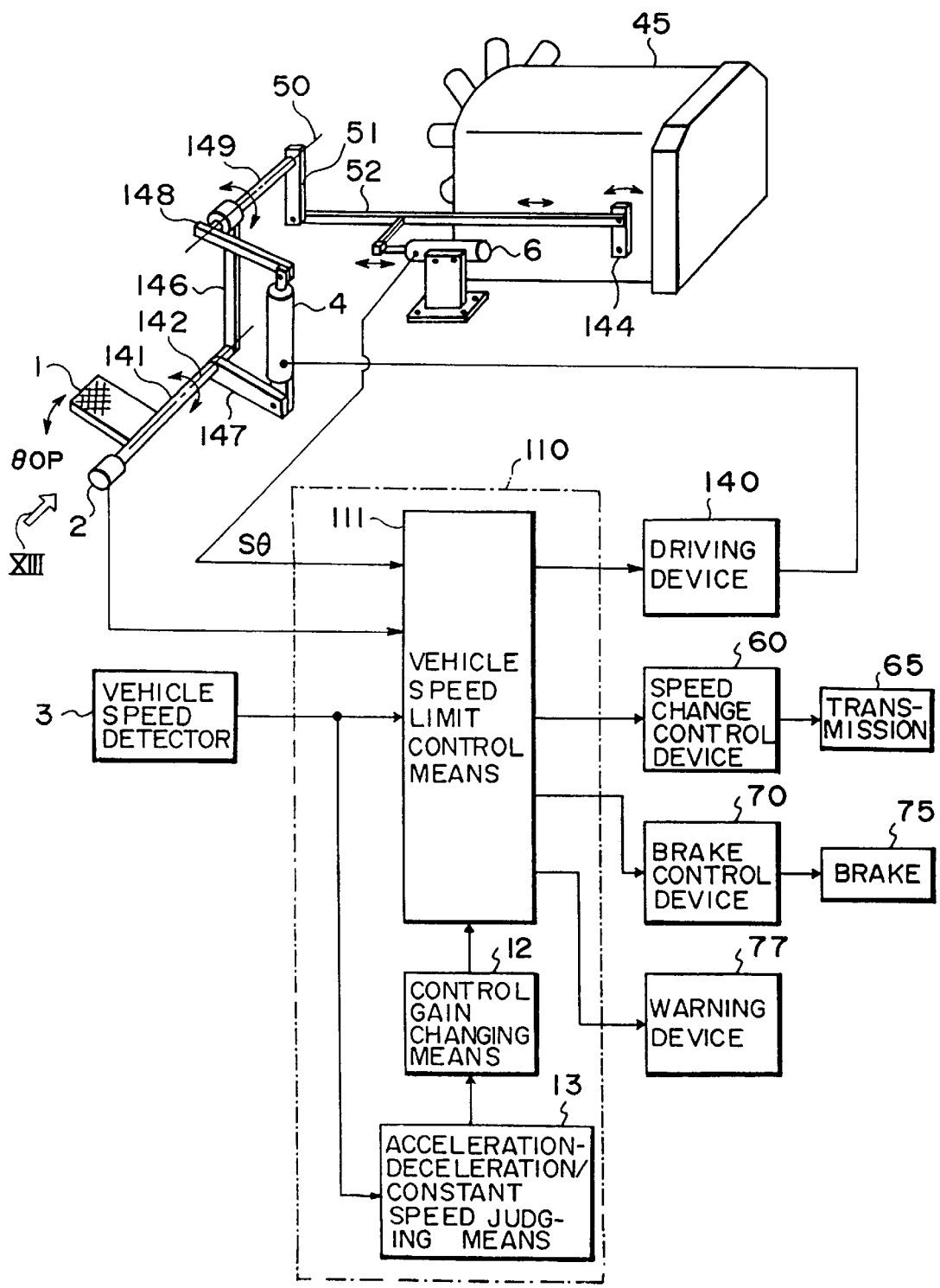
FIG. 10 is a basic block diagram of a vehicle speed limiting apparatus according to a third embodiment of the present invention.

Referring to FIG. 10, the accelerator pedal 1 is connected to a first shaft 141 so that the first shaft rotates about a first central axis 142 by the depressing angle $\theta$op in proportion to the stroke amount thereof. One end of a first member 146 and one end of a second member 147 are adhered to the first shaft 141. A through hole having a second central axis parallel to the first central axis 142 is formed in the other end of the first member 146, and a second shaft 149 is inserted into the hole so as to be rotatable about a second central axis 50. One end of a third member 148 is adhered to the second shaft 149, and an actuator 4 is secured between the other end of the second member 147 and the other end of the third member 148. The actuator 4 controls an accelerator lever 144 when controlling the vehicle speed, and is secured so that the second shaft 149 rotates about the second central axis 50. One end of a fourth member 51 is adhered to the second shaft 149, and a fifth member 52 is secured between the other end of the fourth member 51 and the accelerator lever 144. Incidentally, the securing position of the other end of the fourth member 51 and the fifth member 52 is away from the first central axis 142 by a predetermined distance.

In this way, the structure such that the depressing angle $\theta$op can be corrected by the actuation of the actuator 4 is downsized and simplified, so that the structure of the working vehicle comprising the engine 45 having a conventional mechanical governor can be easily modified.

In addition, in order to detect an operating amount of the accelerator lever 144, an accelerator lever operating amount detector 6 (hereinafter, referred to as an operating amount detector 6) is provided. As the operating amount detector 6, a potentiometer is adopted which detects a linear operating amount of the fifth member 52 approximately equivalent to the operating amount of the accelerator lever 144. A detecting lever end of the potentiometer 6 is coupled to the fifth member 52, and a main body side of the potentiometer 6 is adhered to the vehicle body.

A vehicle speed control device 110, similar to that of the first embodiment, is composed of a vehicle speed limit control means 111, a control gain changing means 12, and an acceleration-deceleration/constant speed judging means 13. A stroke amount of the accelerator pedal 1 is inputted to the vehicle speed limit control means 111 through a stroke detector 2, and a vehicle speed signal of a vehicle speed detector 3 is inputted to the vehicle speed limit control means 111 and the acceleration-deceleration/constant speed judging means 13. The vehicle speed limit control means 111 controls the actuator 4, a transmission 65, and a brake 75 through a driving device 140, a vehicle speed change control device 60, and a brake control device 70, respectively.

In this embodiment, the stroke detector 2 detects the stroke amount with the depressing angle θop when the first shaft 141 rotates about the first central axis 142. The vehicle speed detector 3 detects the vehicle speed of the working vehicle, and outputs the vehicle speed signal to the vehicle speed limit control means 111. When the input vehicle speed signal has become larger, or is becoming larger than a vehicle speed limit value, the vehicle speed limit control means 111 controls the actuator 4 through the driving device 140 so that a deviation value between the vehicle speed signal and the vehicle speed limit value becomes smaller, and corrects the depressing angle of the accelerator pedal 1. In addition, the vehicle speed limit control means 111 inputs signals from the stroke detector 2 and the operating amount detector 5 to perform judgment of a failure diagnosis of the control and an overspeed warning.

An acceleration-deceleration/constant speed judging means 13 judges whether the present vehicle speed is in the stable vehicle speed period or in the acceleration-deceleration period while the vehicle speed limit control means 111 is correcting the depressing angle to perform vehicle speed control. The results of the judgment are outputted to a control gain changing means 12. The control gain changing means 12 inputs the results of the judgment as to whether the present vehicle speed is in the stable vehicle speed period or in the acceleration-deceleration period, and outputs a control gain suited thereto to the vehicle speed limit control means 111. A driving device 140 inputs an actuator driving command signal from the vehicle speed limit control means 111, and outputs a power signal for driving the actuator 4 based on the command signal. The actuator 4 is operated by the power signal.

The vehicle speed change control device 60 inputs switching vehicle speed data, obtained when downshifting and upshifting corresponding to each speed stage, and the present vehicle speed data from the vehicle speed limit control means 111, and compares the switching vehicle speed data with the present vehicle speed data to judge whether a downshift or an upshift should be done. When the downshift or upshift should be done, the transmission 65 is controlled so that the corresponding speed stage is achieved. The brake control device 70 inputs a brake operating signal from the vehicle speed limit control means 111, and control the brake 75 based on the signal. A warning device 77 inputs a warning signal from the vehicle speed limit control means 111, and gives a warning to a driver based on the warning signal. It is the same as that of the first embodiment.

Figure 11:
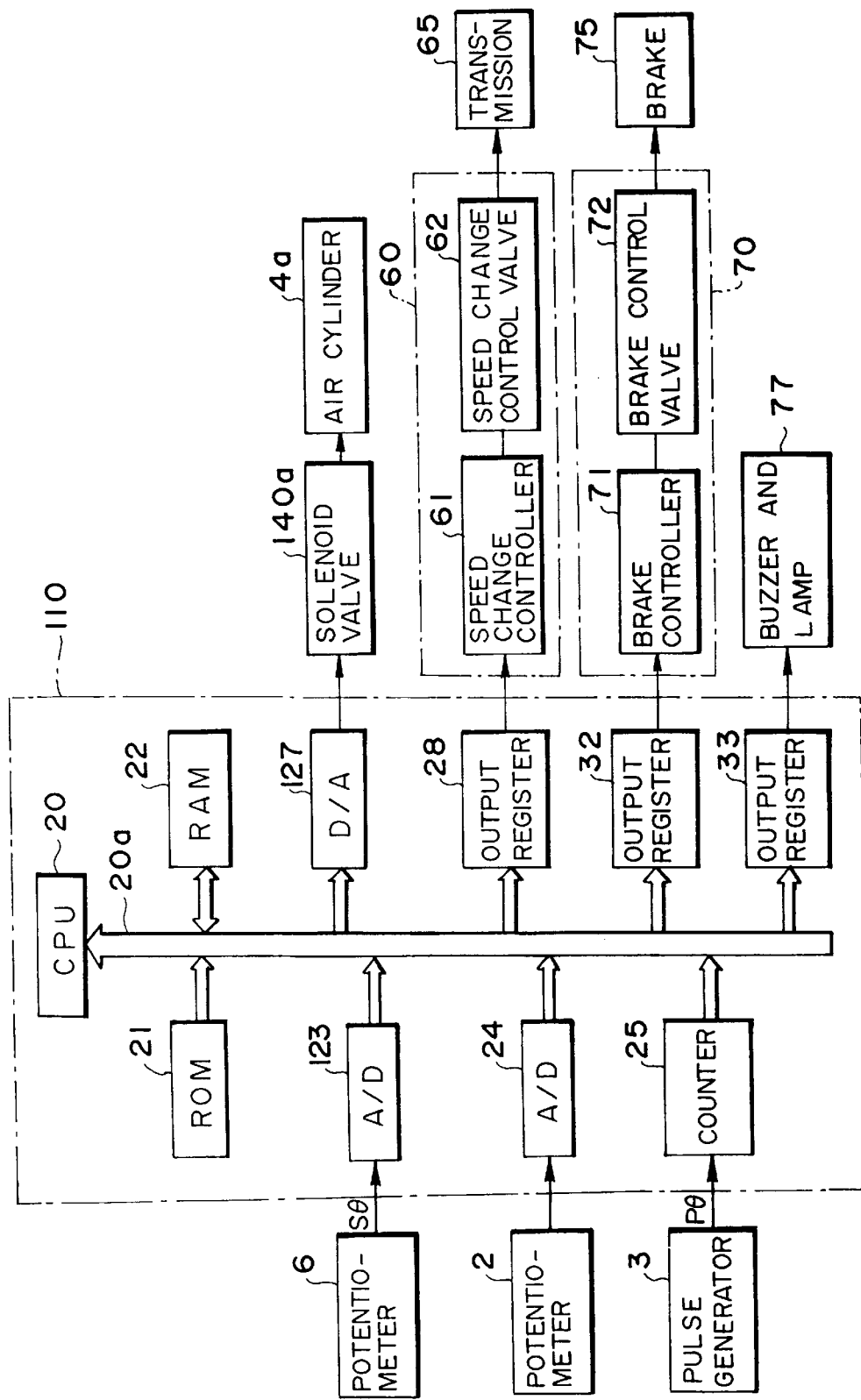
FIG. 11 is a specific circuit block diagram of a vehicle speed limit control device according to the third embodiment.

Referring to FIG. 11, the potentiometer, which is the stroke detector 2, is fixed so as to detect a rotation angle of the first shaft 141 about the first central axis 142. In addition, although a potentiometer is also employed as the operating amount detector 6 as described above, these potentiometers can be either a rotary type or a linearly movable type. The vehicle speed detector 3 employs a pulse generator as in the case of the first embodiment.

Figure 12:
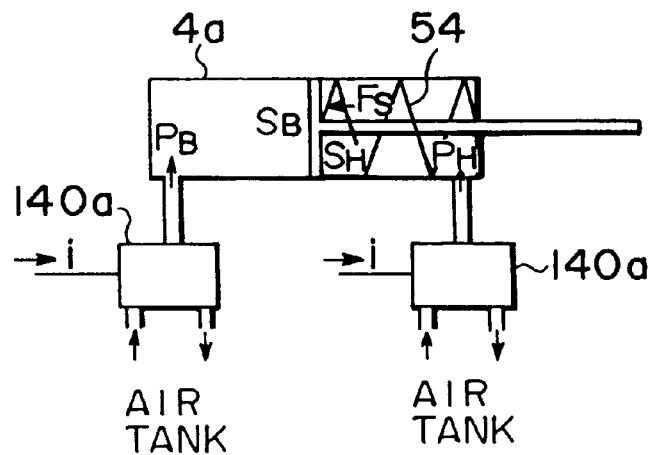
FIG. 12 illustrates construction of an air cylinder and a solenoid valve employed for an actuator according to the third embodiment.

As the actuator 4 for correcting the depressing angle of the accelerator pedal 1 and as the driving device 140 for driving this, an air cylinder 4a and a solenoid valve 140a are employed, respectively. A driving method of the air cylinder 4a and the solenoid valve 140a is, for example, shown in FIG. 12. Here, in order to improve the response of the control of the air cylinder 4a, air pressures on the bottom and head sides are controlled at the same time. In addition, for the purpose of fail-safe at the time of a fault of the control system, a spring 54 is contained in the head side of the air cylinder 4a. The solenoid valve 140a controls the above-described air pressures, converts air supplied from an air pump into air pressure in proportion to the magnitude of an input current I, and outputs this.

Now, air pressure on the bottom side supplied from the solenoid valve 140a is taken as PB, air pressure on the head side is taken as PH, and the cylinder pressure-receiving areas on the bottom side and on the head side are taken as SB and SH, respectively. In addition, a force of the spring 54 for pressing the piston from the head side when the cylinder is located at this position is taken as FS, and the slide resistance of the cylinder is taken as FT. If the difference between a force of the air pressure on the bottom side for pressing the piston and a force of the air pressure on the head side for pressing the piston is taken as P, P is represented by the expression "P=PB·SB−PH·SH". Thus, when P satisfies the expression "P>FS−FT", the piston will move to the head side (extends), while when P satisfies the expression "P>FS−FT", the piston will move to the bottom side (contract). When the slide resistance FT is small, the extension length of the piston can be controlled by controlling the above-described P.

Incidentally, the control can be simplified by containing the spring 54 in the head side of the air cylinder 4a. In this case, the extension length of the piston can be controlled by controlling the bottom side air pressure PB, and by controlling P represented by the expression "P=PB·SB−FS". In addition, a hydraulic cylinder, a hydraulic motor, and an electrically-driven servo motor, for example, can be used as the actuator 4. In this case, a hydraulic directional control valve, a hydraulic servo valve, and an electrically-driven servo amplifier, respectively, are adopted and driven as the driving device 140.

The speed change control device 60 is composed of a speed change controller 61 and a speed change control valve 62. The speed change controller 61 differs from that of the first embodiment in that data (the above-described vehicle speed value data and the present vehicle speed value data) is inputted from the vehicle speed limit control means 111 (in the vehicle speed control device 110).

The vehicle speed control device 110 is composed of a microcomputer, as shown in FIG. 11, and differs from the vehicle speed control device of FIG. 2 mainly in that A/Ds (A/D converters) 123 and 127 are attached thereto. That is, the A/D 123 converts an analog voltage signal, from the potentiometer 6 for detecting the accelerator lever operating amount, into a digital form, and the digital value is outputted to the CPU 20 through the bus 20a. The D/A 127 converts a digital value of an air pressure control command outputted from the CPU 20 into an analog current command, and a current proportional to the magnitude of the digital value is outputted. According to this embodiment in which the air pressures of the bottom side and the head side of the air cylinder 4a are controlled, a D/A 127 is provided for each controlling solenoid valve 140a.

In addition, the CPU 20 executes a periodic interrupt at each predetermined unit time to input a calculated value, and at the same time, resets a counter 25 to return the calculated value to zero. Based on the counted value input to the CPU 20, the traveling distance per unit time, i.e., the vehicle speed is calculated.

An operation of the vehicle speed limiting device in this embodiment will now be described.

First, a mechanical operational mechanism of the accelerator lever 144 by the accelerator pedal 1 and the air cylinder 4a will be described. When the accelerator pedal 1 is depressed to the position of the depressing angle θop, the first member 146 and the second member 147 rotate about the first central axis 142 in proportion to the depressing angle θop. When the air cylinder 4a is not actuated, a link made by the members 146, 147, 148, and the air cylinder 4a is fixed. Thus, the link rotates about the first central axis 142, and the fourth member 51 equivalently rotates about the first central axis 142 along with this through the second shaft 149. At this time, since the securing position of the other end of the fourth member 51 and the fifth member 52 is away from the first central axis 142 by a predetermined distance, the above-described rotation allows the fifth member 52 to rotate the accelerator lever 144 in response to the depressing angle θop. In this way, the accelerator lever 144 operates in response to the width of the depressing angle θop.

Figure 13:
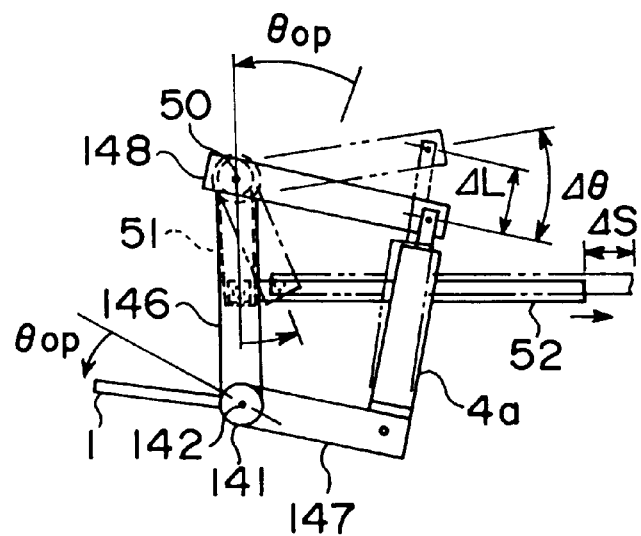
FIG. 13 is a drawing as viewed from the direction of arrow XIII of FIG. 10 which illustrates action of the actuator.

Next, an operation of the air cylinder 4a when the accelerator pedal 1 is in the condition of the depressing angle θop will be described with reference to FIG. 13. When the air cylinder 4a is actuated to rotate the third member 148 about the second central axis 50 by an angle Δθ, the fourth member 51 also rotates about the second central axis 50 by the angle Δθ, whereby the fifth member 52 operates the accelerator lever 144 in response to the angle Δθ. At this time, when the air cylinder 4a extends, the accelerator lever 144 operates in a direction to decrease the fuel injection amount. When the air cylinder 4a contracts, the accelerator lever 144 operates in a direction to increase the fuel injection amount.

When the above-described angle Δθ is small, the angle Δθ is approximately proportional to a very short extension length of the air cylinder 4a, and is approximately proportional to an operating amount ΔS of the accelerator lever 144 at that time. Thus, by controlling an extension length ΔL, the depressing angle θop can be equivalently corrected. Incidentally, a servo motor, etc., can be used as the actuator 4 to control the angle Δθ by directly rotating the third member 148 or the second shaft 149 about the second central axis 50. In the following description of the operation, the control of the angle Δθ is described in consideration of the above-described matters, but the control of the extension length ΔL, etc., in the case of the air cylinder 4a is basically equivalent to the control of a very small amount of movement of the actuator 4.

Main functions of the microcomputer system which make up the vehicle speed control device 110 are as follows:

(1) Equivalent of the vehicle speed limit control means 111. The vehicle speed pulse counted value is inputted through the counter 25, and the vehicle speed is calculated to write the vehicle speed value into a predetermined address in a RAM 22. In addition, the depressing angle of the accelerator pedal 1 is inputted through the A/D 24. The vehicle speed limit value stored in the RAM 22 or a predetermined vehicle speed threshold value is read out to be compared with the vehicle speed. When the vehicle speed is smaller, the present command value is continuously outputted to the D/A 127 to fix the air cylinder 4a on a predetermined initial position. At this time, the operation of the accelerator lever 144 due to the accelerator pedal 1 is performed by means of mechanical transmittance alone, and the fuel injection amount of the engine is controlled.

In addition, when the vehicle speed becomes larger than the vehicle speed limit value or the predetermined vehicle speed threshold value, an operating command value of the air cylinder 4a for correcting the operating amount of the accelerator lever 144 is calculated so that a deviation between the vehicle speed and the vehicle speed limit value becomes smaller, and current command data corresponding to the operating command data are outputted to the D/A 127. At this time, a control gain value for calculating the operating command value of the air cylinder 4a is read out of a predetermined address in the RAM 22. This allow the operation of the accelerator lever 144 to be controlled by the air cylinder 4a so that the vehicle speed becomes the vehicle speed limit value. When a period in which the vehicle speed limit traveling should be done terminates, and it is judged that shifting to the accelerated traveling should be done, predetermined command data are outputted to the D/A 127 in order to fix the air cylinder 4a again on the predetermined initial position.

(2) The operations due to the equivalents of the acceleration-deceleration/constant speed judging means 13 and the control gain changing means 12 are the same as those of the first embodiment.

Figure 15:
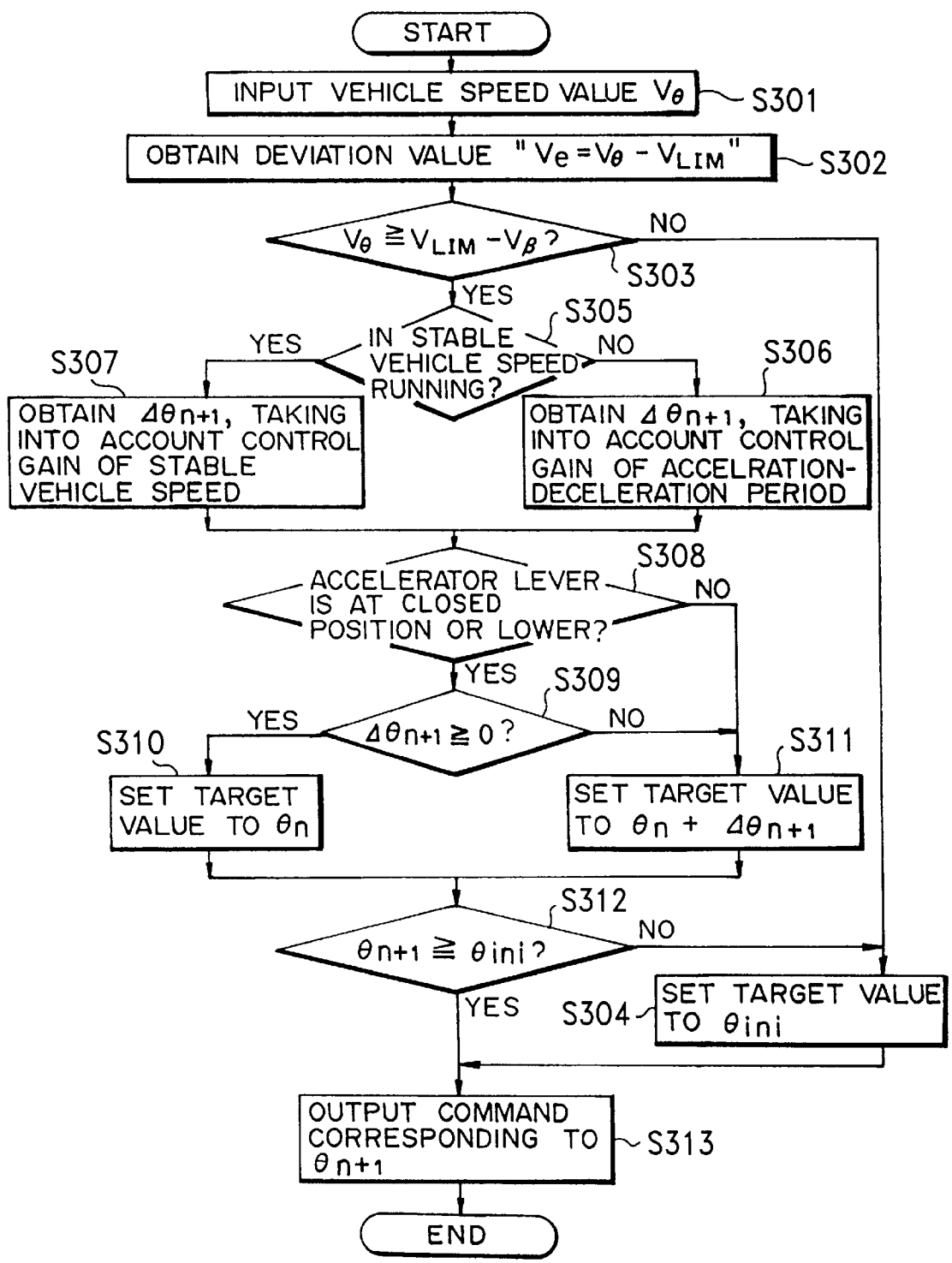
FIG. 15 is a flowchart of vehicle speed limit control according to the third embodiment.

A detailed description thereof will be given below. Temporary data, etc., used for each control constant and the control, are stored in the RAM 22. For the purpose of description, these data are assumed to be stored in addresses shown in FIGS. 14A and 14B. In addition, the actual accelerator pedal depressing angle is taken as θop, as shown in FIG. 13, the initial length of the air cylinder when the air cylinder 4a does not correct θop is taken as Lini, and the initial rotation angle of the fourth member 51 around the second central axis 50 is taken as θini. FIG. 15 shows a control flow of the vehicle speed limit, and the vehicle speed limit control flow will be described with reference to FIGS. 10 to 15. In this control flow, it is assumed that the CPU 20 performs a process at each predetermined period. A control target value of the air cylinder 4a during the n-th periodic process is taken as Ln, and the rotation angle of the fourth member 51 around the second central axis 50 corresponding thereto is taken as θn. Incidentally, as in the case of the first embodiment, "step 301, . . . " is indicated as "S301, . . . ".

S301: Assume that the vehicle starts from the stopped state, and the accelerator pedal 1 is depressed to the depressing angle θop. The fourth member 51 rotates about the first central axis 142 in proportion to the width of the depressing angle θop, and the fifth member 52 operates the accelerator lever 144 in response to this rotation angle. The speed of the engine 45 increases or decreases in response to the operating amount, and the vehicle is accelerated or decelerated. At the same time, the CPU 20 inputs the counted value of a pulse train Pθ from the vehicle speed detector 3 (pulse generator) from a counter 25. The CPU 20 calculates a travel distance per unit time from the calculated value of the pulse train Pθ and tire diameter data of the driving rear wheel stored in a predetermined address in the RAM 22 to convert it into a vehicle speed value Vθ. The vehicle speed value Vθ is primarily stored in a predetermined address in the RAM 22.

S302: A vehicle speed deviation Ve is obtained from the vehicle speed limit value VLIM in a predetermined address in the RAM 22 and the vehicle speed value Vθ by the expression "Deviation Ve=Vehicle speed value Vθ−Vehicle speed limit value VLIM". Next, the procedure advances to S304.

S303: Whether or not the vehicle speed value Vθ becomes larger than a predetermined threshold value "VLIM−Vβ", which shows an area for performing the control of the vehicle speed limit, is determined. Here, Vβ is 0 or a positive speed value for determining the threshold value. When Vβ is set to the predetermined positive speed value, the control of the vehicle speed limit can be performed earlier before reaching the vehicle speed limit value VLIM, and the vehicle speed can be converged on the vehicle speed limit value VLIM with a smaller overshoot amount of the vehicle speed. The procedure advances to S304 to perform accelerated traveling when the vehicle speed value Vθ is smaller than the above-described threshold value, and advances to S305 when the vehicle speed Vθ is equal to or greater than the threshold value.

S304: A rotation angle target value θn+1 of the fourth member 51 around the second central axis 50 is set to θini. To this end, the difference P between the bottom side force and the head side force such that the air cylinder 4a has the initial length Lini is obtained, and this is taken as Pn. Thereafter, the procedure advances to S313.

S305: It is judged whether the behavior of the vehicle speed control is the stable vehicle speed period or the acceleration-deceleration period. In this embodiment, the judgment is made, as described below, with the magnitude of the deviation Ve of the vehicle speed and the elapsed time of a period in which the deviation is regarded as small. That is, it is determined whether or not an absolute value of the vehicle speed deviation Ve is smaller than a predetermined value Vα (positive constant). When the absolute value of the deviation Ve is smaller than the predetermined value Vα, the elapsed time in that condition is measured. When the elapsed time becomes larger than a predetermined time tα, it is regarded as entering the stable vehicle speed period. When the above-described condition is not satisfied, it is regarded as the acceleration-deceleration period. This result of judgment is written into a predetermined address in the RAM 22 as an acceleration-deceleration/constant speed judgment result flag. Based on the acceleration-deceleration/constant speed judgment result flag, the procedure advances to S307 if it is the stable vehicle speed period, while the procedure advances to S306 if it is the acceleration-deceleration period.

S306: Based on the deviation Ve and the acceleration, a very small amount of change Δθn+1 in the rotation angle target value θn+1 for correcting the depressing angle θop is obtained. At this time, the control gain Kθ of the stable vehicle speed period stored in a predetermined address in the RAM 22 is considered. The control gain Kθ of the stable vehicle speed period is normally set to a suitably small value. Next, the procedure advances to S308.

S307: As in the case of S306, based on the deviation Ve and the acceleration, a very small amount of change Δθn+1 in the rotation angle target value θn+1 for correcting the depressing angle θop is obtained. At this time, the control gain Kθ of the stable vehicle speed period stored in the predetermined address in the RAM 22 is considered. The control gain Kθ of the stable vehicle speed period is normally set to a suitably small value. Next, the procedure advances to S308.

S308: The present accelerator lever operating position Sθ is inputted by the potentiometer 6, and whether or not it is at an total close position, i.e., an idling position or lower is judged. If the total close position or lower, the procedure advances to S309. If not so, the procedure advances to S311.

S309: It is judged whether or not the very small amount of change Δθn+1 obtained in S307 is zero or higher. If zero or higher, the procedure advances to S310. If not so, the procedure advances to S311.

S310: Since the accelerator lever operating position Sθ cannot be set to the total close position or lower, the rotation angle target value θn+1 is set to be equal to the preceding target value θn. To this end, the above-described difference Pn+1 of the air cylinder 4a is set to be equal to the preceding Pn. Here, although the Pn, which is written in a predetermined address in the RAM 22 during the preceding output, is read out, the first Pn is taken as Pini corresponding to the initial length Lini. In addition, the obtained Pn+1 is written in a predetermined address in the RAM 22 so as to be used next time. Next, the procedure advances to S312.

S311: The rotation angle target value θn+1 is obtained from the very small amount of change Δθn+1 and the preceding target value θn obtained in the S306 or S307 based on the expression "θn+1=θn+Δθn+1". To this end, a very small amount of change ΔPn+1 in the difference P corresponding to the Δθn+1 is calculated so that the rotation angle target value θn+1 is achieved by the operation of the air cylinder 4a to thereby set Pn+1 based on the expression "Pn+1=Pn+ΔPn+1". Here, Pn is the value at the time of the preceding output, similar to the above description, and the obtained Pn+1 is written into a predetermined address in the RAM 22. Next, the procedure advances to S312.

S312: Whether or not the rotation angle target value θn+1 is the initial angle θini or higher is judged. If θini or higher, the procedure advances to S313 because the air cylinder falls within a controllable range. If smaller than θini, it is a state where the air cylinder is completely returned, and the procedure advances to S304 in order to set the rotation angle target value θn+1 to the initial angle. Incidentally, θn+1 becomes smaller than the initial angle θini when the operator returns the actual depressing angle θop, and when the traveling load increases due to an uphill road, etc., so that a torque larger than the traveling load cannot be produced by the engine output equivalent to the depressing angle θop.

S313: Air pressure of the solenoid valve 140a which satisfies the difference Pn+1 of the air cylinder 4a is obtained, and a current command value corresponding to the air pressure is calculated. Then, the current command is outputted through the D/A 127. The periodic process of this time is terminated here, and the next periodic process is started from S301.

The above-described S306 and S307 will be described in detail. A general PID control and control employing fuzzy inference enables control of the vehicle speed to a constant speed by obtaining the very small amount of change Δθn+1 in the rotation angle target value θn+1 for correcting the depressing angle θop based on the vehicle speed deviation Ve and/or the acceleration.

First, an embodiment of a method for obtaining the very small amount of change Δθn+1 based on, for example, the vehicle speed deviation Ve in the PID control will be described.

Now, assume that the very small amount of change Δθn+1 is obtained by the expression "Δθn+1=Kθ×Δθmin2" at the point of time of the n+1-th periodic process. Here, Δθmin2 is a predetermined minimum correction amount unit for obtaining Δθn+1. The deviation Ve can be employed for Δθmin2, and a predetermined value which is set so that control stabilizes can be employed. However, Δθmin2 is set in consideration of the sign of the deviation Ve. When the sign of the deviation is positive, the sign of Δθmin2 should be positive. By this, when the vehicle speed Ve is the vehicle speed limit value VLIM or higher, the air cylinder 4a is extended so as to return the accelerator lever 144. In addition Kθ is a predetermined control gain for obtaining Δθn+1. This control gain is set with respect to the acceleration-deceleration period and the stable vehicle speed period, respectively, and is stored in a predetermined address in the RAM 22.

In S305, in response to the judged result, the control gain with respect to the acceleration-deceleration period or the stable vehicle speed period is written into a predetermined address in the RAM 22 where the control gain Kθ, used when limiting the vehicle speed, is stored. In S306 or S307, the control gain Kθ, used when limiting the vehicle speed, is read from the above-described predetermined address. The correction value Δθn+1 can be obtained by the expression "Δθn+1=Kθ×Δθmin2" using this control gain Kθ.

In this way, the rotation angle target value θn+1 is obtained by the expression "θn+1=θn+Δθn+1", and θn+1 is controlled by the operation of the air cylinder 4a. In the period of limiting the vehicle speed, if the vehicle speed Vθ exceeds the vehicle speed limit value VLIM, the air cylinder 4a extends to return the depressing angle θop in a direction to decelerate by an angle equivalent to Δθn+1. In addition, if the vehicle speed value Vθ decreases lower than VLIM, the air cylinder 4a contracts to return the depressing angle θop in a direction to accelerate by an angle equivalent to Δθn+1.

Figure 16:
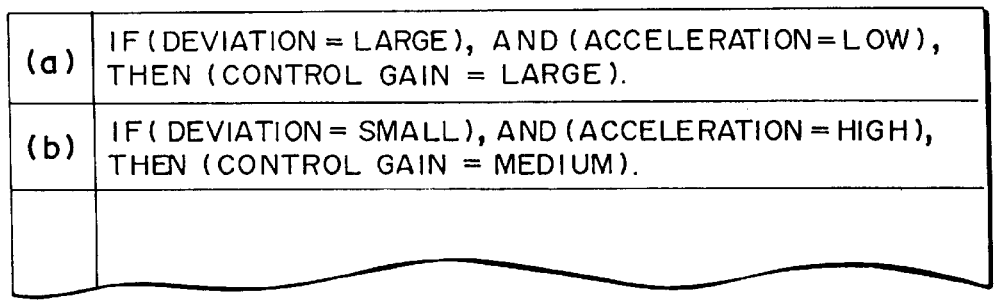
FIG. 16 is a diagram of rules illustrating control by fuzzy inference according to the third embodiment.

Next, an embodiment employing fuzzy inference in S306 and S307 will be described. Here, assume that the very small amount of change Δθn+1 is obtained based on the vehicle speed deviation Ve and the acceleration. A specific fuzzy inference is conducted by the CPU 20 as in the case of the second embodiment. The membership functions of the vehicle speed deviation and the acceleration which are conditions of judgment are the same as those in FIGS. 8A and 8B of the second embodiment. FIG. 16 shows each rule for determining the magnitude of the control gain Kθ, and the control gain Kθ is calculated by the same method as that of the second embodiment.

The fuzzy inference is conducted by switching the reference value of the horizontal axis of each membership function into two values in the case of the constant vehicle speed period and in the case of the acceleration-deceleration period. The reference value is stored in a predetermined address in the RAM 22 as a constant equivalent to the control gain Kθ of the stable vehicle speed period or the acceleration-deceleration period of FIGS. 14A and 14B. The horizontal axis reference value Vek (see FIG. 8A) is set as in the case of the second embodiment. In the case of the stable vehicle speed period, the control gain is calculated to be rather small, while the control gain is calculated to be rather large in the case of the acceleration-deceleration period. This is equivalent to the fact that the control gain is switched in the stable vehicle speed period and in the acceleration-deceleration period as in the example of the above-described PID control, so that the response of the control is improved.

In addition, the correction value Δθn+1 can be obtained by the expression "Δθn+1=Kθ×Δθmin2" based on the control gain Kθ obtained in the above description and the above-described Δθmin2. Although Δθmin2 is the predetermined minimum correction amount unit for obtaining Δθn+1, it is herein assumed to be the positive number. It is assumed that the magnitude and the sign of the control gain Kθ are determined by each rule shown in FIG. 16. The control gain Kθ obtained by the rule becomes the optimum control gain value such that the magnitude of the present vehicle speed deviation is considered, and the vehicle speed is smoothly converged on the vehicle speed limit value with good response. Therefore, air pressure of an air cylinder 4a is controlled and the rotation angle target value θn+1 is controlled based on the correction value Δθn+1, so that the vehicle speed can be controlled accurately.

Figure 17A:
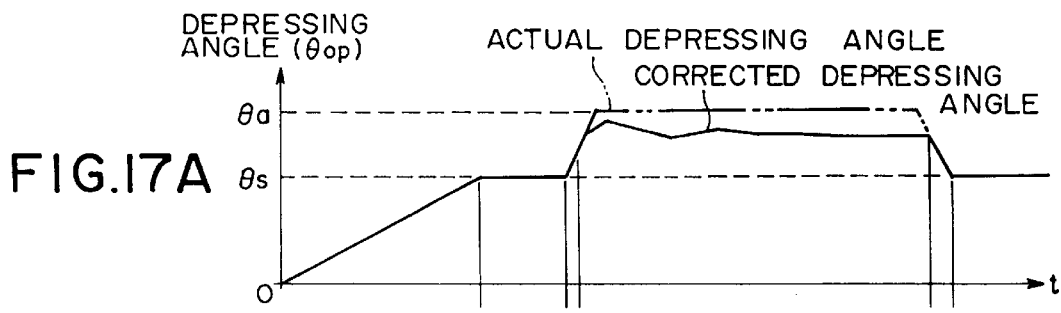
FIG. 17A is a graph showing changes with time in a depressing angle from a vehicle stop condition according to the third embodiment.
Figure 17B:
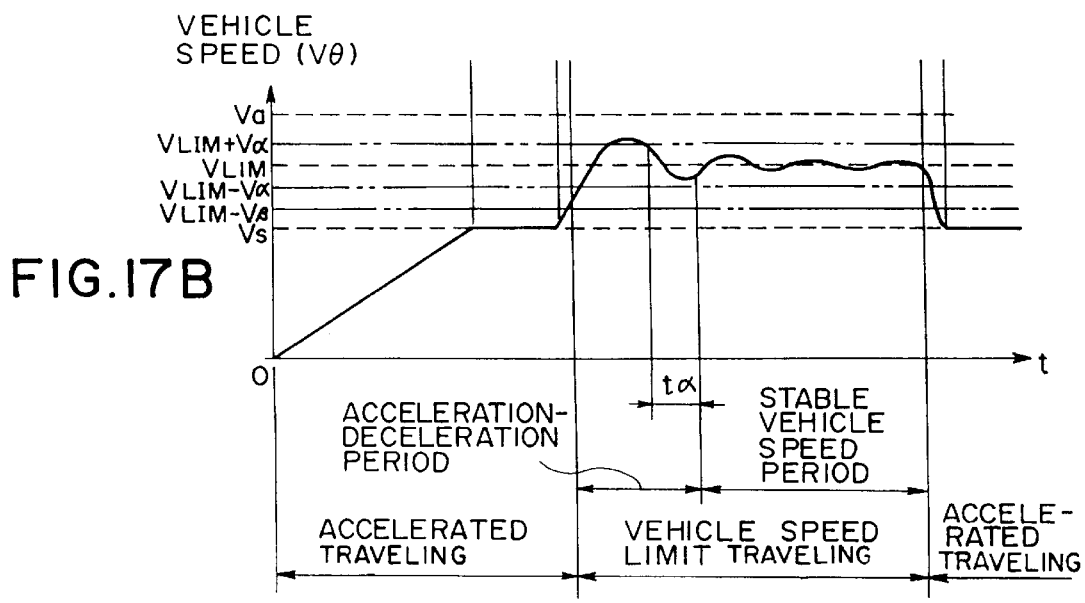
FIG. 17B is a graph showing changes with time in vehicle speed corresponding to FIG. 17A.

The flow of the process for vehicle speed limit traveling will be specifically described with reference to the control flow of FIG. 15. Referring to FIGS. 17A and 17B, the threshold value "VLIM−Vβ", for judging whether or not the control of the vehicle speed limit is conducted, is set smaller than the threshold value "VLIM−Vα" for judging the acceleration-deceleration period. In addition, it is assumed that the very small amount of change Δθn+1 in the rotation angle target value θn+1 is obtained by the PID control. When the accelerator pedal 1 is slowly depressed to the angle θs, the vehicle speed Vs equivalent to the angle es is smaller than the threshold value "VLIM−Vβ", so that the process of the control flow advances in the order of S301 to S304, and the vehicle is smoothly accelerated while performing a normal accelerated traveling. After the vehicle speed has reached Vs, the accelerated traveling at the vehicle speed Vs is performed.

Next, it is assumed that the accelerator pedal 1 is suddenly depressed from the depressing angle θs to the depressing angle θa, and the vehicle speed Va equivalent to the depressing angle θa is larger than the vehicle speed limit value VLIM. In the starting stage of acceleration, the vehicle speed value is smaller than the threshold value "VLIM−Vβ", so that the process of the control flow advances in the order of S301 to S304. Since the CPU 20 outputs a command of air pressure equivalent to the initial position Lini of the air cylinder 4a, the accelerator lever 144 follows the accelerator pedal 1. This rapidly increases the speed of the engine 45, whereby the vehicle is accelerated so that the vehicle speed value becomes Va.

When the vehicle speed value Vθ becomes larger than the threshold value "VLIM−Vβ" in S303 in the course of the above-described acceleration, the vehicle speed limit traveling state is set, and the procedure advances to S305. The early stage of the vehicle speed limit traveling is regarded as the acceleration-deceleration period as shown in FIG. 17B, so that the procedure advances to S306. Further, the procedure advances to S308, and S311 to S313, and each of the S301 to S303, S305, S306, S308, and S311 to S313 is repeated. At this time, if the vehicle speed Vθ once exceeds VLIM as shown in FIG. 17B, the depressing angle θop is further corrected to decelerate gradually. When the vehicle speed decreases lower than the vehicle speed limit value VLIM at a certain point of time, the depressing angle θop is corrected to accelerate. In addition, as a result of correcting the depressing angle θop, when the accelerator lever operating position Sθ is at the total close position or lower in S308, the total close position is maintained n S309 and S310 when the next correction output is in a direction to further decelerate.

Incidentally, in the course of increasing or decreasing the vehicle speed Vθ, the absolute value of the vehicle speed deviation Ve may become smaller than Vα. From this point of time, the measurement of the elapsed time for judging whether the vehicle speed enters the stable vehicle speed period is started in S305. In this process, when a period θ in which the absolute value of the vehicle speed deviation Ve is smaller than Vα continues and the elapsed time becomes a predetermined time tα or longer, it is regarded as the stable vehicle speed period. Then, the process advances to S301 to S303, S305, and S307, so that the control gain of the stable vehicle speed period is selected as the control gain Kθ.

If the absolute value of the vehicle speed deviation becomes larger than Vα due to an abrupt load fluctuation during the vehicle speed limit control, the control gain is immediately switched at that point of time to the control gain of the acceleration-deceleration period so that the vehicle speed deviation becomes small in a short period of time. Thus, the response of the vehicle speed control with respect to the abrupt load fluctuation is improved. In this way, the vehicle speed stabilizes while gradually converging on the vehicle speed limit value VLIM.

Incidentally, when the driver gradually returns the accelerator, the actual depressing angle θop becomes small until the calculated n+1-th rotation angle target value θn+1 becomes smaller than the initial position θini. For this reason, the position of the air cylinder 4a returns to the initial position Lini and further correction of the depressing angle θop is not required. At this time, the process advances to S312 and S304 to terminate the previous vehicle speed limit traveling. Thereafter, the traveling is shifted again to the traveling by the accelerator pedal 1, so called the accelerated traveling.

In the example of FIGS. 17A and 17B, if the rotation angle target value $\theta n+1$ is obtained based on the vehicle speed deviation Ve and the acceleration in the manner as described above, the vehicle speed $V\theta$ can be promptly converged on the vehicle speed limit value VLIM by decreasing the overshoot amount thereof. In this case, a judging threshold value (VLIM−V$\beta$), for shifting to the limit traveling, is set smaller than the target VLIM. For example, when the deviation Ve is small but the acceleration is large, the correction value $\Delta\theta n+1$ is set rather large to converge the vehicle speed earlier. Incidentally, the acceleration is calculated from the vehicle speed signal, and is calculated as an amount of change in the vehicle speed per unit time. In this way, when the vehicle speed $V\theta$ approaches to the vehicle speed limit value VLIM, and exceeds the judging threshold value, the vehicle speed can be limited earlier, and the vehicle speed does not greatly exceed the vehicle speed limit value VLIM. Due to the above-described control flow, the response during control is good, as in the case of the first embodiment.

The rotation angle target value $\theta n+1$ in each periodic process in this embodiment is obtained by correcting the preceding output by a very small amount in a direction to decrease the vehicle speed deviation. Since response is affected by the magnitude of this correction value, it is necessary to calculate the correction value suited to control. For example, in S306 or S307, when the minimum correction amount unit $\Delta\theta min2$ is a small set value, it takes time to correct the depressing angle $\theta op$ if the actual depressing angle $\theta op$ is significantly larger than the vehicle speed limiting speed. Thus, if the calculation is made with the minimum correction amount unit $\Delta\theta min2$ corresponding to the width of the actual depressing angle $\theta op$, an improvement in the response can be achieved. For example, the minimum correction amount unit $\Delta\theta min2$ can be obtained by the expression "$\theta op/K$" with respect to the depressing angle $\theta op$, whereby it is confirmed, as in the case of the first embodiment, that the response is remarkably improved.

Figure 18:
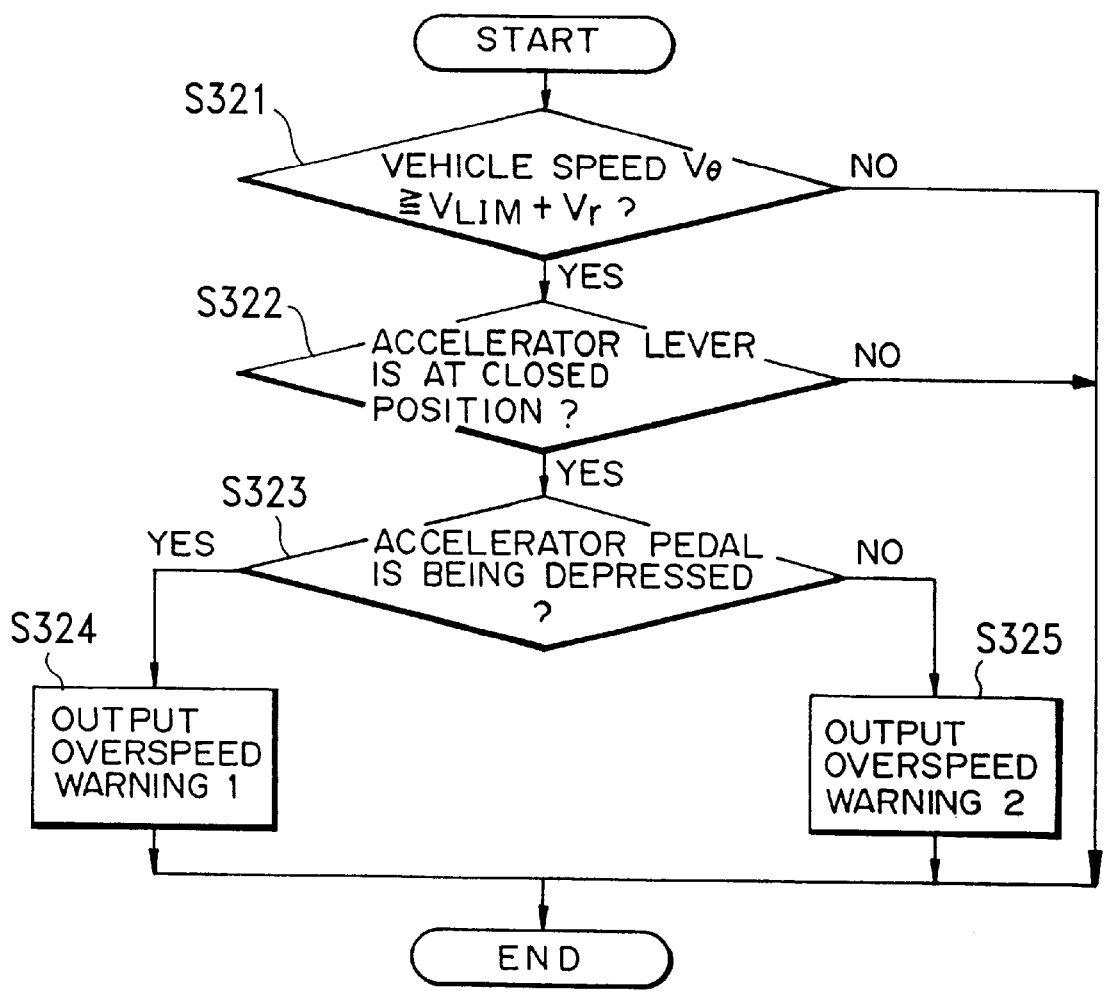
FIG. 18 is a flowchart of an overspeed warning process according to the third embodiment.

In addition, the dump truck tends to develop the above-described coasting state, and the vehicle speed value may exceed the vehicle speed limit value. In such a case, it is desirable to warn the operator to call attention. Thus, the CPU 20 actuates a buzzer and a lamp 77 through a register 33 to warn the operator of an uncontrollable state of the vehicle speed limit. FIG. 18 shows a process flowchart of the CPU 20 at this time.

S321: It is judged whether or not the vehicle speed $V\theta$ is a predetermined vehicle speed value "VLIM+V$\gamma$" or higher which is larger than the vehicle speed limit value VLIM. If "VLIM+V$\gamma$" or higher, the procedure advances to S322. If not so, the procedure advances to end. Here, V$\gamma$ is a vehicle speed deviation threshold value for a criterion of judgment of the overspeed warning.

S322: The operating position of the accelerator lever 144 is inputted from the potentiometer 6, and whether or not the position is the total close position. If the total close position, the procedure advances to S323. If not so, the procedure advances to end.

S323: It is judged whether or not the accelerator pedal 1 is depressed. If depressed, the procedure advances to S324. If not, the procedure advances to S325. This judgment is effected by judging whether or not an output voltage of the potentiometer 2 for detecting the depressing angle of the accelerator pedal is a predetermined value or higher.

S324: Since the vehicle speed limit is not effective, a warning (referred to as an overspeed warning 1) is outputted.

S325: Since the vehicle speed limit is not effective, a warning (referred to as an overspeed warning 2) is outputted.

In the above-described S324 and S325, the vehicle speed $V\theta$ significantly exceeds the vehicle speed limit value VLIM although the accelerator lever 144 is on the total close position. Thus, a warning to the operator is effected. Here, when the accelerator pedal 1 is depressed, the overspeed warning 1 is outputted, while the overspeed warning 2 is outputted when the accelerator pedal 1 is not depressed so as to make distinction therebetween. This distinction can be effected by changing the on/off time and the tone of a buzzer sound and by changing a display message. In order to avoid the condition, the operator can manually downshift and actuate a brake.

Further, the speed change stage can be automatically downshifted and the brake can be actuated. That is, when the vehicle speed limit by only the engine control is impossible in the coasting state, a downshifting of the speed change stage and an actuation of the brake enable an accurate control of the vehicle speed limit. In addition, during the vehicle speed limit control, the braking force become larger when hard upshifting of the speed change stage is caused to maintain the present speed stage, so the vehicle speed limit can easily be controlled.

For example, when the CPU 20 outputs the brake actuating command data to the register 32, the brake controller 71 actuates the brake 75, so that the vehicle speed decreases gradually. Thereafter, the vehicle speed reaches a predetermined vehicle speed, and the CPU 20 outputs to the register 28 downshift judging vehicle speed value data, which are larger than the present data. The speed change controller 61 judges that the downshifting should be done earlier than the normal downshifting time, and actuates the speed change control valve 62 to downshift the transmission 65. This can provide larger braking torque at the time of engine control, so that the vehicle speed can be limited frequently even in the coasting state.

In addition, the CPU 20 outputs to the register 28 upshift judging vehicle speed data, which are larger than the present data, whereby the speed change controller 61 judges that the upshifting should be done later than the normal upshifting time, so that hard upshifting is caused and the present speed stage of large braking torque can be maintained.

Further, during the vehicle speed limit control, fault diagnosis of the actuator 4 and the operating amount detector 6 is effected to increase control reliability. For example, the fault diagnosis is effected in the following manner.

(1) When the vehicle speed limit control is not performed, the depressing angle $\theta op$ is not corrected. Thus, $\theta ops$ obtained by converting the operating position inputted from the operating amount detector 6 into the depressing angle based on the mechanical location must be equal to the actual $\theta op$. Thus, when the vehicle speed limit control is not performed, fault is judged if "$\theta op \neq \theta ops$".

(2) When the vehicle speed exceeds a predetermined value (VLIM+V$\delta$), which is larger than the vehicle speed limit value, the accelerator lever operating position $S\theta$ shall always be located on the total close position. Thus, fault is judged if the accelerator lever operating position $S\theta$ is not located on the total close position.

(3) $\theta ops$, converted into the depressing angle based on the mechanical location, always becomes a smaller value than the actual $\theta op$. Thus, a fault is judged if "$\theta op < \theta ops$".

Next, a fourth embodiment will be described. This embodiment in an embodiment wherein the dump truck is systematically operated, and as shown in FIG. 19, is equivalent to a construction such that the control constant setting means 5 and the external environmental condition detecting means 7 of the second embodiment are attached based on the construction of the third embodiment.

Figure 19:
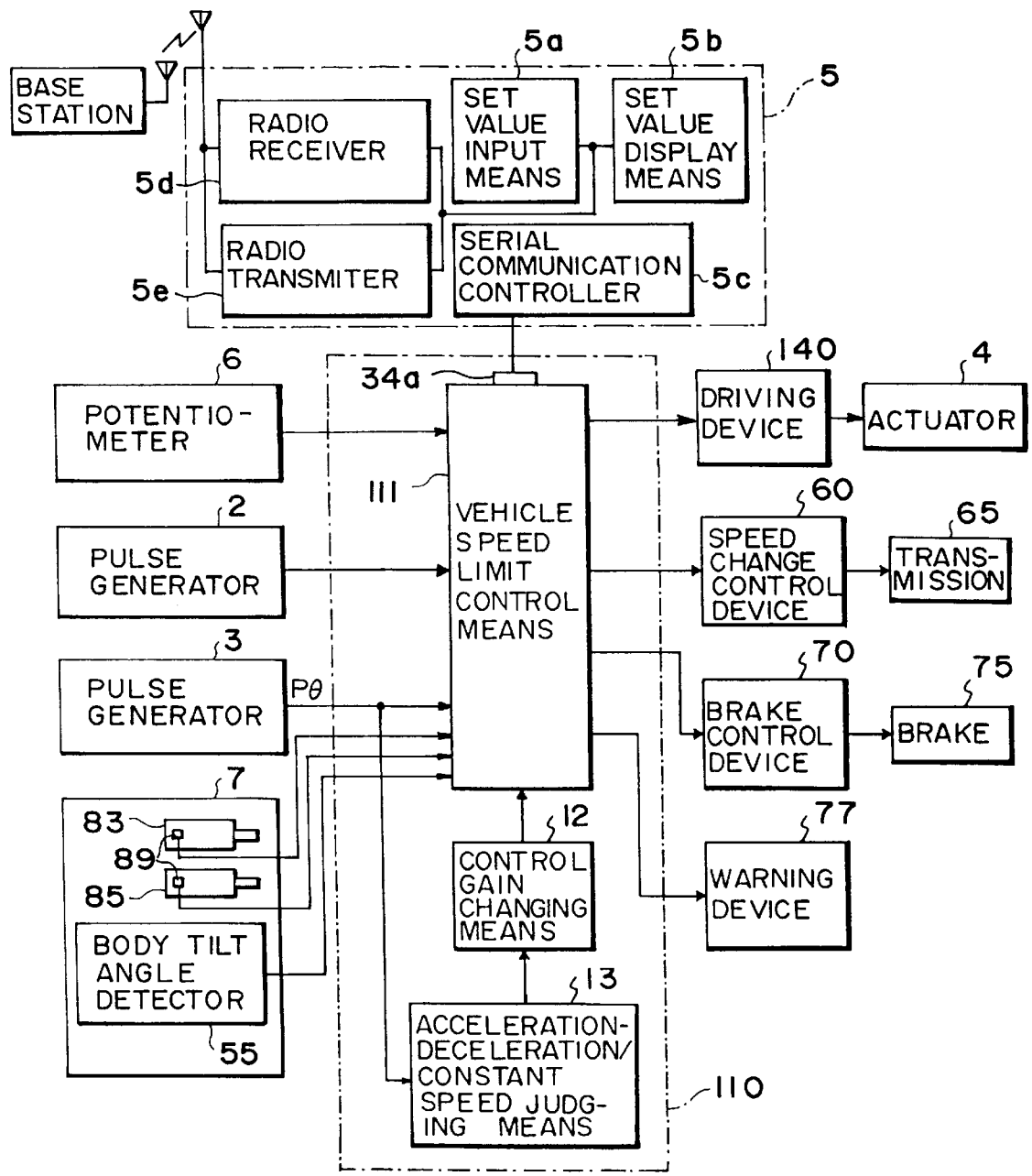
FIG. 19 is a basic block diagram of a vehicle speed limiting apparatus according to a fourth embodiment of the present invention.
Figure 20:
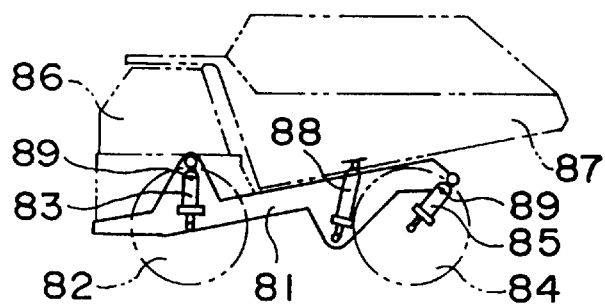
FIG. 20 is a side view of a dump truck comprising a vehicle speed limiting apparatus according to the prior art.
Figure 21:
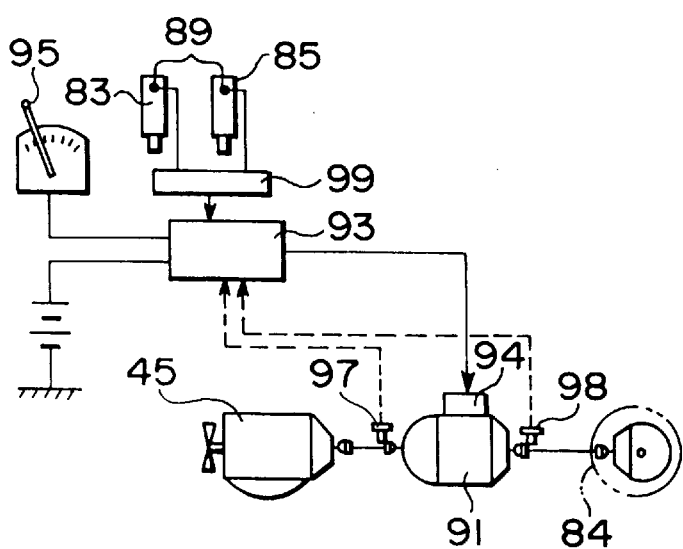
FIG. 21 is an illustration of a schematic construction of a vehicle speed limiting apparatus according to the prior art.
Figure 22:
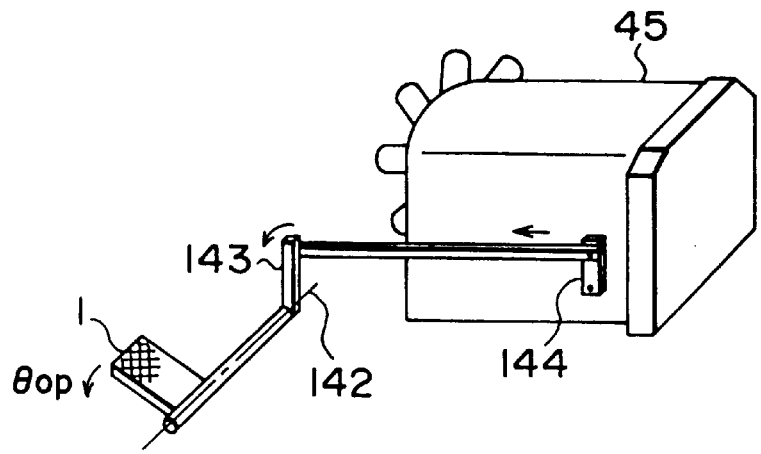
FIG. 22 is an illustration of the relationship between an accelerator pedal and an engine having a mechanical governor of the vehicle speed limiting apparatus according to the prior art.
Figure 23:
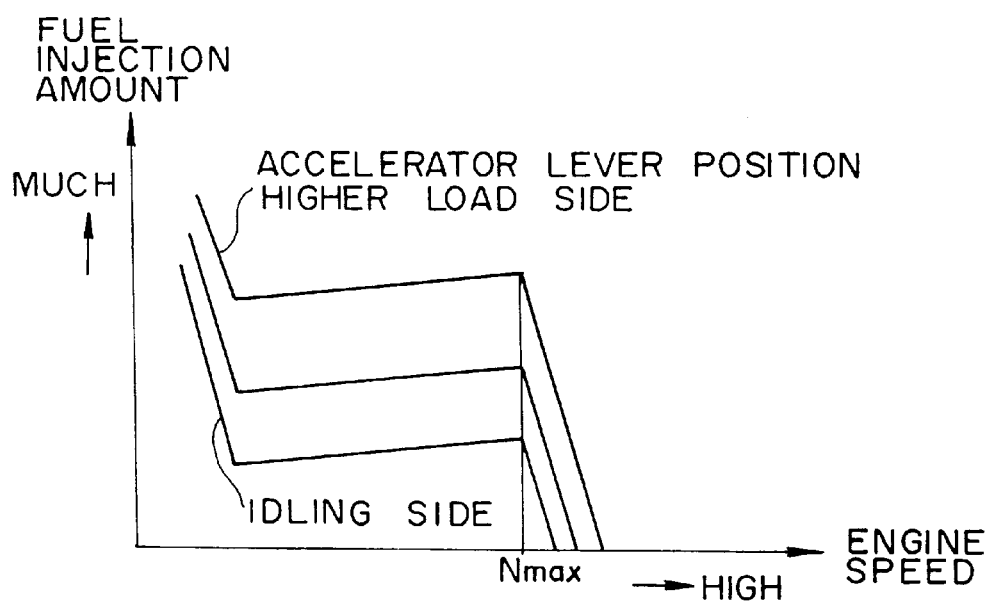
FIG. 23 is a diagram showing speed control characteristic in the apparatus of FIG. 22.

Referring to FIG. 19, the control constant setting means 5 inputs and outputs a set value information signal from and to a vehicle speed limit control means 111 in a vehicle speed control device 110. The vehicle speed control device has a serial communication controller part (not shown) for performing serial communication with the control constant setting means 5, and the CPU 20 transmits and receives a set value information signal, etc. In the vehicle speed control device 110, a controller (not shown) is provided for inputting signals from a pressure sensor 89 and body tilt angle detector 55, and the CPU 20 inputs a pressure value and a body tilt angle through the controller.

The RAM 22 of the vehicle speed control device 110, as shown in FIGS. 14A and 14B, for example, stores each control constant when the load weight is within the allowable value, each control constant when there is overloading weight, and each control constant when there is a steep grade. In addition, similar to FIGS. 8A, 8B, and 8C, membership functions of the acceleration and the load weight which are conditions of judgment are set, and similarly, a membership function (not shown) of the grade of the road surface grade is set. Further, each rule for determining the magnitude of the control gain Kθ is prepared by making the load weight, the grade of the road surface, the vehicle speed deviation, and the acceleration the condition of judgment.

In such a construction, the control gain Kθ used in S306 and S307 of the third embodiment was obtained with application of fuzziness as in the case of the second embodiment. This, as in the case of the second embodiment, facilitates calculation under complicated environmental conditions, and a range (condition) of possibility of the vehicle speed limit traveling is expanded.

INDUSTRIAL APPLICABILITY

The present invention is useful as an apparatus and a method for limiting the vehicle speed of a working vehicle which can provide a smooth traveling condition without deteriorating the ride quality during vehicle speed limit in accelerated traveling, and which can set a vehicle speed limit value to the value suited to a load weight and an environmental condition.

We claim:

1. An apparatus suitable for limiting a vehicle speed of a working vehicle, wherein the working vehicle includes:
   an accelerator pedal;
   a depressing stroke detector, for detecting a depressing stroke amount of said accelerator pedal;
   an engine control device, for outputting an accelerating signal based on a magnitude of a depressing stroke signal inputted from said depressing stroke detector; and
   an engine, a speed of which is controlled by said accelerating signal;
   said apparatus comprising:
      a vehicle speed detector, for detecting a vehicle speed of the working vehicle to output a vehicle speed signal; and
      a vehicle speed control device, connectable to said depressing stroke detector, said vehicle speed detector, and said engine control device, and having:
         a vehicle speed limit control means,
         an acceleration-deceleration/constant speed judging means, and
         a control gain changing means;
      wherein said vehicle speed limit control means:
         inputs said vehicle speed signal and said depressing stroke signal to compare said vehicle speed signal with a predetermined vehicle speed limit value,
         judges a vehicle speed limit traveling period, when said vehicle speed signal is equal to or greater than said predetermined vehicle speed limit value, to calculate a corrected depressing stroke signal by a control gain which obtains a correction amount of said depressing stroke signal, based on a deviation value between said vehicle speed signal and said predetermined vehicle speed limit value so that said deviation value becomes smaller, to output said corrected depressing stroke signal to said engine control device; and
      wherein said acceleration-deceleration/constant speed judging means:
         judges a stable vehicle speed period, when said deviation value in said vehicle speed limit traveling period is less than or equal to a predetermined value over a predetermined period of time, and
         judges an acceleration-deceleration period, in a case other than said stable vehicle speed period, to output to said control gain changing means a result of a judgment by said acceleration-deceleration/constant speed judging means; and
      wherein said control gain changing means outputs, to said vehicle speed limit control means, a control gain in said stable vehicle speed period or a control gain in said acceleration-deceleration period, based on the results of the judgment by said acceleration-deceleration/constant speed judging means.

2. An apparatus suitable for limiting a vehicle speed of a working vehicle in accordance with claim 1, further comprising:
   a warning device for inputting a warning signal from said vehicle speed control device to give a warning to a driver,
   wherein said vehicle speed control device outputs an accelerating stop signal such that said corrected depressing stroke signal is zero, and outputs said warning signal when said deviation value is not within a predetermined range of values even if said accelerating stop signal is continuously outputted for a predetermined period of time.

3. An apparatus suitable for limiting a vehicle speed of a working vehicle in accordance with claim 1 further comprising:
   a control constant setting means having one of:
      (a) a set value input means for setting in advance said vehicle speed limit value and said control gain as set values, and
      (b) said set value input means and a set value display means for displaying said set values; and
   wherein said control constant setting means and said vehicle speed control device mutually input and output set value information including said set values.

4. An apparatus suitable for limiting a vehicle speed of a working vehicle in accordance with claim 3, further comprising:
   an environmental condition detecting means, for detecting a traveling situation of the working vehicle and an external environmental situation, to output a detected situation signal to said vehicle speed control device; and wherein said vehicle speed control device inputs said predetermined vehicle speed limit value and said control gain, corresponding to said situation signal, from said control constant setting means, to calculate said corrected depressing stroke signal based on the inputted predetermined vehicle speed limit value and the inputted control gain.

5. An apparatus suitable for limiting a vehicle speed of a working vehicle in accordance with claim 1, further comprising:

a transmission having a plurality of speed stages;

a speed change control device, for inputting, in advance, downshift judging vehicle speed value data and upshift judging vehicle speed value data, for comparing the judging vehicle speed value data with current vehicle speed data to judge a possibility of a speed change of said speed stages, and for outputting a shifting signal to a corresponding speed stage to control said transmission when a speed change is possible; and a brake control device, for outputting a brake control signal based on a braking signal to control a brake;

wherein said vehicle speed control device outputs an accelerating stop signal such that said corrected depressing stroke signal is zero, and outputs one of:
said downshift judging vehicle speed value data,
said upshift judging vehicle speed value data, or
said braking signal
when said deviation value is not within a predetermined range of values even if said accelerating stop signal is continuously outputted for a predetermined period of time.

6. An apparatus suitable for limiting a vehicle speed of a working vehicle, wherein the working vehicle includes:

an accelerator pedal;

a depressing stroke detector, for detecting a depressing stroke amount of said accelerator pedal;

an engine control device, for outputting an accelerating signal based on the magnitude of a depressing stroke signal inputted from said depressing stroke detector; and an engine, a speed of which is controlled by said accelerating signal;

said apparatus comprising:
a vehicle speed detector, for detecting the vehicle speed of said working vehicle to output a vehicle speed signal; and
a vehicle speed control device, connected to said depressing stroke detector, said vehicle speed detector, and said engine control device;
wherein said vehicle speed control device:
inputs said vehicle speed signal and said depressing stroke signal to compare a predetermined vehicle speed threshold value, which is smaller than a vehicle speed limit value, with said vehicle speed signal,
judges a vehicle speed limit traveling period, when said vehicle speed signal is equal to or greater than said predetermined vehicle speed threshold value, to calculate a corrected depressing stroke signal, by a control gain which obtains a correction amount of said depressing stroke signal based on acceleration calculated from said vehicle speed signal and a deviation value between said vehicle speed signal and said predetermined vehicle speed limit value so that said deviation value becomes smaller, and to output said corrected depressing stroke signal to said engine control device, and
judges an accelerated traveling period, when said vehicle speed signal is smaller than said predetermined vehicle speed threshold value, to output said depressing stroke signal to said engine control device.

7. An apparatus suitable for limiting a vehicle speed of a working vehicle in accordance with claim 6, wherein said vehicle speed control device comprises:

an acceleration-deceleration/constant speed judging means, for:
judging a stable vehicle speed period, when said deviation value in said vehicle speed limit traveling period is less than or equal to a predetermined value over a predetermined period of time, and
judging an acceleration-deceleration period, in a case other than said stable vehicle speed period, to output a result of a judgment by said acceleration-deceleration/constant speed judging means;
a control gain changing means, for outputting said control gain in response to a result of the judgment by said acceleration-deceleration/constant speed judging means; and
a vehicle speed limit control means, for judging one of said vehicle speed limit traveling period and said accelerated traveling period to output to said engine control device one of said calculated corrected depressing stroke signal and said depressing stroke signal, in response to the thus judged one of said vehicle speed limit traveling period and said accelerated traveling period.

8. An apparatus suitable for limiting a vehicle speed of a working vehicle in accordance with claim 6, further comprising a warning device, for inputting a warning signal from said vehicle speed control device, to give a warning to a driver, wherein said vehicle speed control device outputs an accelerating stop signal such that said corrected depressing stroke signal is zero, and outputs said warning signal when said deviation value is not within a predetermined range of values even if said accelerating stop signal is continuously outputted for a predetermined period of time.

9. An apparatus suitable for limiting a vehicle speed of a working vehicle in accordance with claim 6, further comprising:

a control constant setting means, having one of:
(a) a set value input means for setting, in advance, said predetermined vehicle speed limit value and said control gain as set values, and
(b) said set value input means and a set value display means for displaying said set values; and
wherein said control constant setting means and said vehicle speed control device mutually input and output set value information including said set values.

10. An apparatus suitable for limiting a vehicle speed of a working vehicle in accordance with claim 9, further comprising:

an environmental condition detecting means, for detecting a traveling situation of the working vehicle and an external environmental situation, to output a detected situation signal to said vehicle speed control device; and wherein said vehicle speed control device inputs from said control constant setting means said vehicle speed limit value and said control gain corresponding to said detected situation signal, to calculate said corrected depressing stroke signal based on the inputted predetermined vehicle speed limit value and the inputted control gain.

11. An apparatus suitable for limiting a vehicle speed of a working vehicle in accordance with claim 6, further comprising:
a transmission having a plurality of speed stages;
a speed change control device, for inputting downshift judging vehicle speed value data and upshift judging vehicle speed value data in advance, for comparing the downshift judging vehicle speed data and the upshift judging vehicle speed data with the present vehicle speed data to judge a possibility of a speed change of said speed stages, and for outputting a shifting signal to a corresponding speed stage to control said transmission when a speed change is possible; and
a brake control device, for outputting a brake control signal based on a braking signal to control a brake;
wherein said vehicle speed control device outputs an accelerating stop signal such that said corrected depressing stroke signal is zero, and outputs one of:
said downshift judging vehicle speed value data,
said upshift judging vehicle speed value data, and
said braking signal
when said deviation value is not within a predetermined range of values even if said accelerating stop signal is continuously outputted for a predetermined period of time.

12. An apparatus suitable for limiting a vehicle speed of a working vehicle, wherein the working vehicle includes:
an accelerator pedal;
an accelerator lever, operated based on a depressing stroke amount of said accelerator pedal; and
an engine, a speed of which is controlled by said accelerator lever through a mechanical governor device;
said apparatus comprising:
a vehicle speed detector, for detecting a vehicle speed of the working vehicle;
a vehicle speed control device, for inputting a vehicle speed signal from said vehicle speed detector, and having:
a vehicle speed limit control means,
an acceleration-deceleration/constant speed judging means, and
a control gain changing means;
a driving device, for inputting a command signal from said vehicle speed control device; and
an actuator, driven by said driving device and correcting said depressing stroke amount to control said accelerator lever;
wherein said vehicle speed limit control means:
judges a vehicle speed limit traveling period, when said vehicle speed signal is equal to or greater than a predetermined vehicle speed limit value, to output to said driving device a command signal calculated by a control gain, based on a deviation value between said vehicle speed signal and said vehicle speed limit value or based on acceleration calculated by said vehicle speed signal and said deviation value, such that said deviation value becomes smaller, and
judges an accelerated traveling period, when said vehicle speed signal is smaller than said predetermined vehicle speed limit value and the calculated command signal is smaller than a predetermined initial value, to output a command of said predetermined initial value to said driving device;
wherein said acceleration-deceleration/constant speed judging means:
judges a stable vehicle speed period, when said deviation value in said vehicle speed limit traveling period is less than or equal to a predetermined value over a predetermined period of time, and
judges an acceleration-deceleration period, in a case other than said stable vehicle speed period, to output to said control gain changing means a result of a judgment by said acceleration-deceleration/constant speed judging means, and
wherein said control gain changing means outputs to said vehicle speed limit control means, a control gain in said stable vehicle speed period or a control gain in said acceleration-deceleration period, in response to a result of a judgment by said acceleration-deceleration/constant speed judging means.

13. An apparatus suitable for limiting a vehicle speed of a working vehicle in accordance with claim 12, further comprising:
a depressing stroke detector, for detecting said depressing stroke amount; and
an accelerator lever operating position detector, for detecting an operating position of said accelerator lever;
wherein said vehicle speed control device inputs said depressing stroke amount and said operating position, converts said operating position into the depressing stroke amount based on a mechanical location, and compares a converted depressing stroke amount with the inputted depressing stroke amount to conduct a fault diagnosis.

14. An apparatus suitable for limiting a vehicle speed of a working vehicle in accordance with claim 12, further comprising a depressing stroke detector, for detecting said depressing stroke amount;
wherein said vehicle speed control device calculates a correction of a position command signal for said actuator based on said control gain in response to said depressing stroke amount to output a corrected position command signal.

15. An apparatus suitable for limiting a vehicle speed of a working vehicle in accordance with claim 14, further comprising:
a warning device, for inputting a warning signal from said vehicle speed control device, to give a warning to a driver;
wherein said vehicle speed control device outputs said warning signal when said accelerator lever is placed in a total close position by said corrected position command signal and when said deviation value is not within a predetermined range of values even if the state of said total close position is continued for a predetermined period of time.

16. An apparatus suitable for limiting a vehicle speed of a working vehicle in accordance with claim 12, further comprising:
a control constant setting means, having one of:
(a) a set value input means, for setting in advance said predetermined vehicle speed limit value and said control gain as set values, and
(b) said set value input means and a set value display means for displaying said set values;
wherein said control constant setting means and said vehicle speed control device mutually input and output set value information including said set values.

17. An apparatus suitable for limiting a vehicle speed of a working vehicle in accordance with claim 16, further comprising one of:
(a) a radio receiver, and
(b) said radio receiver and a radio transmitter, attached to said control constant setting means;
wherein said set value information, which is received by radio from an outside station, is outputted to said vehicle speed control device; and
wherein said set value information and a situation signal, inputted from said vehicle speed control device, are transmitted by radio to said outside station.

18. An apparatus suitable for limiting a vehicle speed of a working vehicle in accordance with claim 12, further comprising:
an environmental condition detecting means, for detecting a traveling situation of the working vehicle and an external environmental situation, to output a detected situation signal to said vehicle speed control device; and
wherein said vehicle speed control device selects said predetermined vehicle speed limit value and said control gain corresponding to said situation signal to calculate a correction value of a position command signal for said actuator.

19. An apparatus suitable for limiting a vehicle speed of a working vehicle in accordance with claim 18, further comprising one of:
(a) a radio receiver, and
(b) said radio receiver and a radio transmitter, attached to said control constant setting means;
wherein said set value information, which is received by radio from an outside station, is outputted to said vehicle speed control device; and
wherein said set value information and said situation signal, inputted from said vehicle speed control device, are transmitted by radio to said outside station.

20. An apparatus suitable for limiting a vehicle speed of a working vehicle in accordance with claim 12, further comprising:
a transmission having a plurality of speed stages;
a speed change control device, for inputting, in advance, downshift judging vehicle speed value data and upshift judging vehicle speed value data, for comparing said downshift judging vehicle speed value data and said upshift judging vehicle speed value data with present vehicle speed data to judge a possibility of a speed change of said speed stages, and for outputting a shifting signal to a corresponding speed stage to control said transmission when a speed change is possible; and
a brake control device, for outputting a brake control signal based on a braking signal to control a brake;
wherein said vehicle speed control device calculates a corrected position command signal for said actuator based on said control gain, and outputs one of:
said downshift judging vehicle speed value data,
upshift judging vehicle speed value data, and
said braking signal
when said accelerator lever is placed in a total close position by said corrected position command signal and said deviation value is not within a predetermined range of values even if a state of said total close position is continued for a predetermined period of time.

21. An apparatus suitable for limiting a vehicle speed of a working vehicle, wherein the working vehicle includes:
an accelerator pedal;
an accelerator lever, operated based on a depressing stroke amount of said accelerator pedal; and
an engine, a speed of which is controlled by said accelerator lever through a mechanical governor device;
said apparatus comprising:
a vehicle speed detector, for detecting a vehicle speed of the working vehicle;
a vehicle speed control device, in which a vehicle speed limit value and a predetermined vehicle speed threshold value, which is smaller than said vehicle speed limit value, are set in advance, to which a vehicle speed signal is inputted from said vehicle speed detector, and which has:
a vehicle speed limit control means,
an acceleration-deceleration/constant speed judging means, and
a control gain changing means;
a driving device, for inputting a command from said vehicle speed control device; and
an actuator, driven by said driving device, for correcting said depressing stroke amount to control said accelerator lever;
wherein said vehicle speed limit control means:
judges a vehicle speed limit traveling period, when said vehicle speed signal is equal to or greater than said predetermined vehicle speed threshold value, to output to said driving device a command calculated by a control gain, based on a deviation value between said vehicle speed signal and said predetermined vehicle speed limit value or based on acceleration calculated from said vehicle speed signal and said deviation value such that said deviation value becomes smaller, and
judges an accelerated traveling period, when said vehicle speed signal is smaller than said vehicle speed threshold value, to output a command of a predetermined initial value to said driving device;
wherein said acceleration-deceleration/constant speed judging means:
judges a stable vehicle speed period, when said deviation value in said vehicle speed limit traveling period is less than or equal to a predetermined value over a predetermined period of time, and
judges an acceleration-deceleration period, in a case other than said stable vehicle speed period, to output to said control gain changing means a results of a judgment by said acceleration-deceleration/constant speed judging means; and
wherein said control gain changing means outputs to said vehicle speed limit control means a control gain in said stable vehicle speed period or a control gain in said acceleration-deceleration period in response to a result of a judgment by said acceleration-deceleration/constant speed judging means.

22. An apparatus suitable for limiting a vehicle speed of a working vehicle in accordance with claim 21, further comprising:
- a depressing stroke detector, for detecting said depressing stroke amount; and
- an accelerator lever operating position detector, for detecting an operating position of said accelerator lever;
- wherein said vehicle speed control device inputs said depressing stroke amount and said operating position, converts said operating position into the depressing stroke amount based on a mechanical location, and compares a converted depressing stroke amount with an inputted depressing stroke amount to conduct a fault diagnosis.

23. An apparatus suitable for limiting a vehicle speed of a working vehicle in accordance with claim 21, further comprising a depressing stroke detector for detecting said depressing stroke amount;
- wherein said vehicle speed control device calculates a corrected position command signal based on said control gain in response to said depressing stroke amount to output said corrected position command signal.

24. An apparatus suitable for limiting a vehicle speed of a working vehicle in accordance with claim 23, further comprising a warning device for inputting a warning signal from said vehicle speed control device to give a warning to a driver;
- wherein said vehicle speed control device outputs said warning signal when said accelerator lever is placed in a total close position by said corrected position command signal and when said deviation value is not within a predetermined range of values even if the state of said total close position is continued for a predetermined period of time.

25. An apparatus suitable for limiting a vehicle speed of a working vehicle in accordance with claim 21, further comprising a control constant setting means having one of:
  (a) a set value input means for setting, in advance, said predetermined vehicle speed limit value and said control gain as set values, and
  (b) said set value input means and a set value display means for displaying said set values;
wherein said control constant setting means and said vehicle speed control device mutually input and output set value information including said set values.

26. An apparatus suitable for limiting a vehicle speed of a working vehicle in accordance with claim 25, further comprising one of:
  (a) a radio receiver, and
  (b) said radio receiver and a radio transmitter, attached to said control constant setting means; and
wherein set value information received by radio from an outside station is outputted to said vehicle speed control device and said set value information and said situation signal inputted from said vehicle speed control device are transmitted by radio to said outside station.

27. An apparatus suitable for limiting a vehicle speed of a working vehicle in accordance with claim 21, further comprising:
- an environmental condition detecting means, for detecting a traveling situation of the working vehicle and an external environmental situation to output a detected situation signal to said vehicle speed control device; and
- wherein said vehicle speed control device selects said predetermined vehicle speed limit value and said control gain corresponding to said detected situation signal to calculate a corrected position command signal for said actuator.

28. An apparatus suitable for limiting a vehicle speed of a working vehicle in accordance with claim 27, further comprising one of:
  (a) a radio receiver, and
  (b) said radio receiver and a radio transmitter, attached to said control constant setting means; and
wherein set value information received by radio from an outside station is outputted to said vehicle speed control device and said set value information and said situation signal inputted from said vehicle speed control device are transmitted by radio to said outside station.

29. An apparatus suitable for limiting a vehicle speed of a working vehicle in accordance with claim 21, further comprising:
- a transmission having a plurality of speed stages;
- a speed change control device, for inputting, in advance, downshift judging vehicle speed value data and upshift judging vehicle speed value data, for comparing said downshift judging vehicle speed value data and said upshift judging vehicle speed value data with present vehicle speed data to judge a possibility of a speed change of said speed stages, and for outputting a shifting signal to a corresponding speed stage to control said transmission when a speed change is possible; and
- a brake control device, for outputting a brake control signal based on a braking signal to control a brake;
- wherein said vehicle speed control device calculates a corrected position command signal based on said control gain, and outputs one of:
  said downshift judging vehicle speed value data,
  said upshift judging vehicle speed value data, and
  said braking signal
when said accelerator lever is placed in a total close position by said corrected position command signal and said deviation value is not within a predetermined range of values even if a state of said total close position is continued for a predetermined period of time.

30. An apparatus suitable for limiting a vehicle speed of a working vehicle, wherein the working vehicle includes:
- an accelerator pedal;
- an accelerator lever, operated based on a depressing stroke amount of said accelerator pedal; and
- an engine, a speed of which is controlled by said accelerator lever through a mechanical governor device;
said apparatus comprising:
  - a vehicle speed detector, for detecting a vehicle speed of the working vehicle;
  - a vehicle speed control device, for:
    inputting a vehicle speed signal from said vehicle speed detector, and
    judging a vehicle speed limit traveling period, when said vehicle speed signal is equal to or greater than a predetermined vehicle speed limit value, to output to said driving device a command calculated such that a deviation between said vehicle speed signal and said predetermined vehicle speed limit value becomes smaller;
  - a driving device, for inputting a command from said vehicle speed control device;
  - an actuator, driven by said driving device, for correcting said depressing stroke amount to control said accelerator lever;

a first shaft, having said accelerator pedal adhered to an outer periphery thereof;

a first member, of which a first end is adhered to said first shaft, and which rotates about a first central axis of said first shaft in proportion to said depressing stroke amount; and a second shaft, through which a second end of said first member is passed in a direction of a second central axis, which is parallel to said first central axis, and which freely rotates about said second central axis while being supported by said first member;

wherein said actuator rotates said second shaft about said second central axis; and wherein said second shaft is rotated by at least one of said actuator and said accelerator pedal to actuate said accelerator lever.

31. A method of limiting a vehicle speed of a working vehicle to be equal to or lower than a vehicle speed limit value, based on a depressing stroke amount of an accelerator pedal and the vehicle speed, said method comprising:

judging a vehicle speed limit traveling period, when said vehicle speed is equal to or greater than said vehicle speed limit value, to calculate a corrected depressing stroke amount based on a deviation value between said vehicle speed and said vehicle speed limit value so that said deviation value becomes smaller, to control said vehicle speed by said corrected depressing stroke amount;

judging an accelerated traveling period, when said vehicle speed is lower than said vehicle speed limit value and said corrected depressing stroke amount is larger than said depressing stroke amount, to control said vehicle speed by said depressing stroke amount;

judging a stable vehicle speed period, when said deviation value in said vehicle speed limit traveling period is less than or equal to a predetermined value over a predetermined period of time; and judging an acceleration-deceleration period, in a case other than said stable vehicle speed period, to control said vehicle speed by a corrected depressing stroke amount calculated, based on different control gains in said stable vehicle speed period or in said acceleration-deceleration period, and said deviation value so that said deviation value becomes smaller.

32. A method of limiting a vehicle speed of a working vehicle to be less than or equal to a vehicle speed limit value, based on a depressing stroke amount of an accelerator pedal and the vehicle speed, said method comprising:

setting in advance a predetermined vehicle speed threshold value, which is smaller than said vehicle speed limit value;

judging a vehicle speed limit traveling period, when said vehicle speed is equal to or greater than said vehicle speed threshold value, to calculate a corrected depressing stroke amount based on acceleration calculated from said vehicle speed and a deviation value between said vehicle speed and said vehicle speed limit value so that said deviation becomes smaller, and to control said vehicle speed by said corrected depressing stroke amount; and judging an accelerated traveling period, when said vehicle speed is lower than said vehicle speed threshold value, to control said vehicle speed by said depressing stroke amount.

* * * * *